US006532862B2

(12) United States Patent
Mork et al.

(10) Patent No.: US 6,532,862 B2
(45) Date of Patent: Mar. 18, 2003

(54) COFFEE MAKER

(75) Inventors: Steve O. Mork, Lowell, MI (US); Joshua E. Netz, Boston, MA (US); David-Henry Oliver, Brookline, MA (US)

(73) Assignee: Access Business Group International LLC, Ada, MI (US)

( * ) Notice: Subject to any disclaimer, the term of this patent is extended or adjusted under 35 U.S.C. 154(b) by 0 days.

(21) Appl. No.: 09/899,734

(22) Filed: Jul. 5, 2001

(65) Prior Publication Data

US 2002/0014161 A1 Feb. 7, 2002

(Under 37 CFR 1.47)

Related U.S. Application Data

(62) Division of application No. 09/564,316, filed on May 3, 2000, now Pat. No. 6,279,459, which is a division of application No. 09/205,463, filed on Dec. 4, 1998, now Pat. No. 6,085,638.

(51) Int. Cl.[7] ............................. A47J 31/22; A47J 31/00
(52) U.S. Cl. ..................... 99/302 C; 99/287; 99/299; 99/279
(58) Field of Search ........................... 99/302 C, 287, 99/280, 281, 282, 283, 279, 299

(56) References Cited

U.S. PATENT DOCUMENTS

| 482,179 A | 9/1892 | Johnson |
|---|---|---|
| 1,602,632 A | 10/1926 | Zorn |
| 1,963,476 A | 6/1934 | Smith |
| D134,876 S | 1/1943 | Schneider |
| 2,522,102 A | 9/1950 | Dold |
| D186,182 S | 9/1959 | Wickenberg |
| 3,025,781 A | 3/1962 | Bossi |
| 3,034,417 A | 5/1962 | Bunn |
| D193,523 S | 9/1962 | Douglas |
| 3,114,484 A | 12/1963 | Serio |
| 3,128,691 A | 4/1964 | Carrillo |
| 3,179,035 A | 4/1965 | Lockett |
| 3,321,115 A | 5/1967 | Rendahl |
| D219,056 S | 10/1970 | Gibson |
| 3,590,723 A * | 7/1971 | Dokos et al. ............. 99/289 R |
| D221,796 S | 9/1971 | Greger |
| D225,365 S | 12/1972 | Beckman |
| D228,053 S | 8/1973 | Knox |
| 3,812,773 A | 5/1974 | Hultsch |
| D233,974 S | 12/1974 | Kiernan |
| 3,935,805 A | 2/1976 | Ihlenfeld et al. |
| D241,400 S | 9/1976 | Painter |
| 4,122,763 A | 10/1978 | Waninger et al. |
| 4,169,978 A | 10/1979 | Hauslein |
| 4,251,004 A | 2/1981 | Sun |
| D266,978 S | 11/1982 | Huisman |
| 4,464,982 A | 8/1984 | Leuschner et al. |
| D286,732 S | 11/1986 | Darnell |
| D292,664 S | 11/1987 | Zimmermann |
| 4,805,523 A | 2/1989 | Stuckey et al. |
| 4,825,757 A | 5/1989 | Stoner |
| 4,833,978 A | 5/1989 | Martone et al. |
| 4,838,152 A | 6/1989 | Kubicko et al. |

(List continued on next page.)

FOREIGN PATENT DOCUMENTS

| GB | 1297493 | 11/1972 |
|---|---|---|
| GB | 2056266 | 3/1981 |

Primary Examiner—Reginald L. Alexander
(74) Attorney, Agent, or Firm—Warner Norcross & Judd LLP

(57) ABSTRACT

A coffee maker having a centrifugal brewing system. The system includes a basket having a bottom and sides extending upwardly therefrom. The sides define multiple vertical ports that extend upwardly from the bottom of the basket. The basket rotates at low angular velocities, preferably less than about 150 RPM, to extract coffee. Extracted coffee exits the basket through the ports.

18 Claims, 21 Drawing Sheets

U.S. PATENT DOCUMENTS

| | | |
|---|---|---|
| 4,872,402 A | 10/1989 | Johnson et al. |
| 4,924,922 A | 5/1990 | Johnson |
| 4,997,015 A | 3/1991 | Johnson |
| 5,094,153 A | 3/1992 | Helbling |
| 5,142,610 A | 8/1992 | Augustine et al. |
| 5,265,517 A | 11/1993 | Gilbert |
| 5,340,597 A | 8/1994 | Gilbert |
| D354,879 S | 1/1995 | Ullmann |
| D355,329 S | 2/1995 | Ullmann |
| 5,393,548 A | 2/1995 | Heiligman |
| D356,712 S | 3/1995 | Brady |
| 5,402,705 A | 4/1995 | Bailleux et al. |
| 5,463,932 A | 11/1995 | Olson |
| D367,798 S | 3/1996 | Storsberg |
| D369,058 S | 4/1996 | Simmons |
| D369,268 S | 4/1996 | Assmann et al. |
| 5,503,060 A | 4/1996 | Morecroft et al. |
| D371,271 S | 7/1996 | Seiffert et al. |
| 5,549,035 A | 8/1996 | Wing-Chung |
| D375,016 S | 10/1996 | Ullmann |
| D378,722 S | 4/1997 | Brady |
| D386,934 S | 12/1997 | Huang |
| D387,946 S | 12/1997 | Hippen |
| 5,699,719 A | 12/1997 | Lucas et al. |
| D389,005 S | 1/1998 | Brady |
| D390,409 S | 2/1998 | Littmann |
| D393,174 S | 4/1998 | Mork et al. |
| D394,981 S | 6/1998 | Huang |
| D394,982 S | 6/1998 | Huang |
| 5,782,163 A | 7/1998 | Chang |

\* cited by examiner

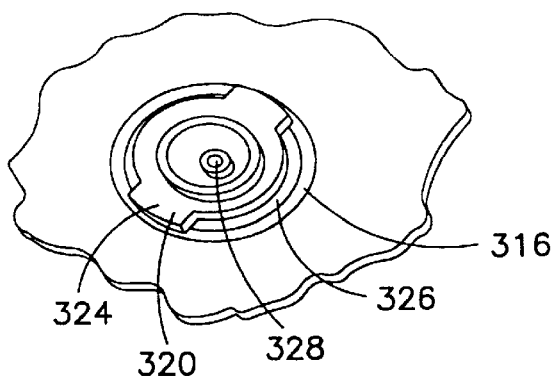
FIG. 23
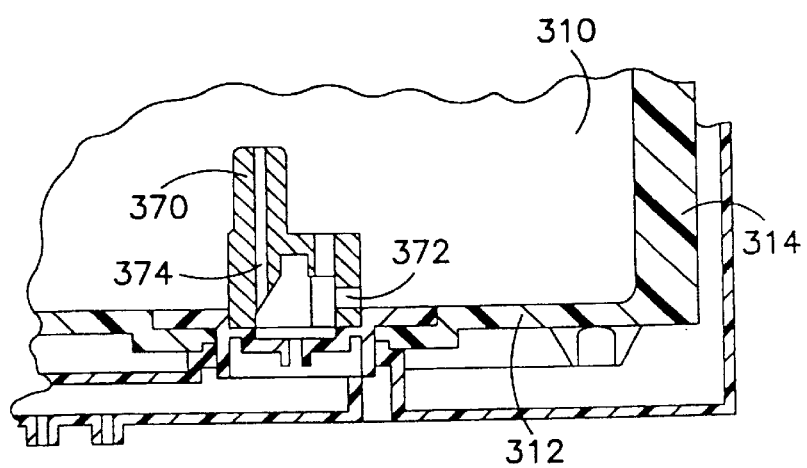
FIG. 25
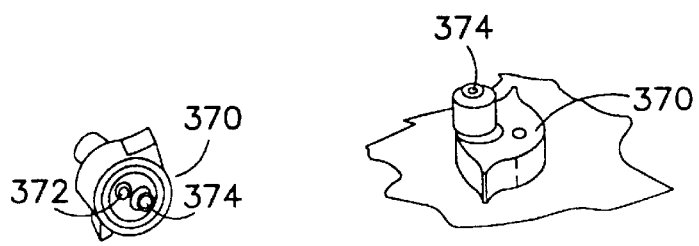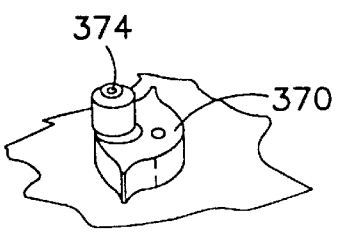
FIG. 26    FIG. 27
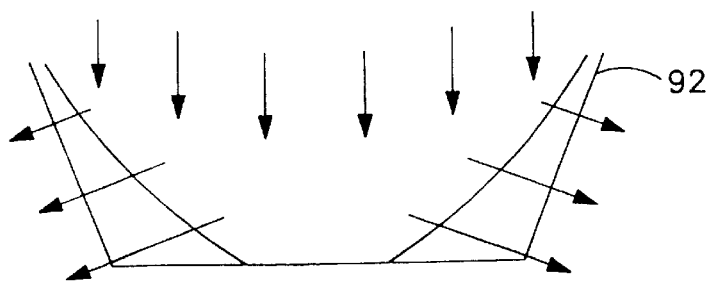
FIG. 28

COFFEE MAKER

This is a divisional of application Ser. No. 09/564,316, filed May 3, 2000 (now U.S. Pat. No. 6,279,459) which is a divisional of application Ser. No. 09/205,463, filed Dec. 4, 1998 (now U.S. Pat. No. 6,085,638).

BACKGROUND OF THE INVENTION

The present invention relates to coffee makers and, more particularly, to a counter-top unit particularly suited for home and other low-volume use.

Counter-top coffee makers are well known in the art. Typically, a coffee maker has a glass or plastic carafe for receiving brewed coffee, the carafe being supported by, or resting upon, a heating element or surface, as seen in U.S. Pat. No. D390,409 to Littman, issued Feb. 10, 1998.

Sometimes a coffee maker includes a thermally insulated carafe for receiving brewed coffee as seen in U.S. Pat. No. 5,463,932 to Olson, issued Nov. 7, 1995; however, a heating element or surface typically is not provided in conjunction with a thermal carafe. The insulated carafe is capable of maintaining the coffee's temperature absent this additional heat source. The absence of the exposed heating element or surface may be a safer alternative for certain consumers, such as those having small children in the household. Additionally, consumers may transport the insulated carafe containing coffee while maintaining the temperature of the coffee. Unfortunately, consumers must choose between a coffee maker with an uninsulated carafe and a coffee maker with an insulated carafe.

Centrifugal coffee makers are also well known in the art. For example, U.S. Pat. No. 5,265,517 to Gilbert, issued Nov. 30, 1993, discloses a centrifugal coffee maker which heats the water and discharges the water over the coffee grounds through two discharge ports located equidistantly from the axis of rotation. A basket containing the coffee grounds spins as the water is discharged. The water flows through the coffee grounds, out of the centrifugal basket, and is collected in a carafe or container. However, this design creates an annular pattern on the grounds, failing to wet much of the grounds. This is insufficient at best and wasteful at worst.

A second apparatus for making coffee and having a centrifugal brewing system is disclosed in U.S. Pat. No. 1,602,632 to Zorn, issued Oct. 12, 1926. The coffee maker uses a plurality of tubes arranged in a spiral to discharge water over coffee grounds. The water is distributed in a circular pattern onto the grounds despite the more complicated structure, resulting in the same inefficiency and waste.

These prior centrifugal brewing systems have a significant drawback in that often the coffee grounds in the rotating basket are not thoroughly and evenly wetted. This may result in a weaker cup of coffee being produced than was anticipated relative to the amount of grounds added to the machine. As a result, extra grounds may have to be added to create a proper strength cup of coffee, which results in wasted grounds.

A further problem encountered by centrifugal brewing systems is overflow of the grounds from the basket during brewing. As a centrifugal basket spins, the slurry of coffee grounds and water is forced against the sides of the basket from the centrifugal force. If the water is unable to exit the centrifugal basket at a sufficient rate, the slurry mixture may overflow the basket, resulting in coffee grounds becoming mixed with the brewed coffee and, thus, producing a cup of coffee with undesirable sediment. This problem is due, in part, to the high speed at which the basket typically is spun.

U.S. Pat. No. 5,265,517 to Gilbert, issued Nov. 30, 1993, discloses a centrifugal basket which preferably spins at 280–350 rpm to force the coffee grounds and water slurry to rise along the interior walls of the centrifugal basket. The coffee escapes through narrow horizontal ports located in the middle portion of the basket walls. The basket intentionally is designed so that the coffee exits the basket slowly to provide sufficient contact time between the grounds and the water; this is believed to be necessary to produce an optimum coffee flavor. To prevent the slurry from overflowing the walls of the basket, the basket is provided with an inwardly-extending rim ring which is snap fit for removal by the user. The ring must be removed to place a coffee filter within the basket.

To heat the brew water prior to depositing it over the coffee grounds, both centrifugal and standard brewing systems use either batch or serial heating. A batch heating system heats all of the brewing water prior to beginning the brewing cycle (i.e. prior to depositing any of the water on the grounds). Batch heating systems include a water heating chamber and a distributor in the bottom of the chamber for regulating the flow of the heated water out of the chamber. The water is stored and heated in the heating chamber until it reaches a specified temperature, usually 195°–205° Fahrenheit. The water is then released through the distributor to flow into the basket containing coffee grounds. The distributor is immersed in water as it rests on the floor of the heating chamber and has water flowing through it. Lime often accumulates on its exterior and within its flow holes, reducing the flow rate of the heated water; thus, the flow of water into the grounds basket is reduced, resulting in a longer brewing time. Ultimately, the distributor may be sufficiently restricted or even blocked so as to require replacement. Often, as a practical matter, this requires replacement of the entire coffee maker unit.

A serial heating system heats the brew water as it flows through a pipe just prior to its being distributed over the coffee grounds. This system includes a water flow pipe and a heating element adjacent to a portion of the flow pipe. The heating element heats the water in the adjacent portion of the flow pipe to at least 212° Fahrenheit, vaporizing the water. The water vapor condenses as it continues past the heating element and is deposited into the basket containing coffee grounds. When the coffee maker is initially filled with water, a portion of the water often flows through the flow pipe to a position downstream of the heating element. When the brewing cycle is activated, the portion of water adjacent the heating element is heated and vaporized. The water vapor moves downstream, pushing the portion of unheated water before it, and the unheated water is deposited over the coffee grounds. For optimal coffee flavor, the brew water should be 195°–205° Fahrenheit when it contacts the coffee grounds. Thus, the extraction of the coffee may be adversely affected by having insufficiently heated water used in the brewing process.

SUMMARY OF THE INVENTION

The aforementioned problems are overcome by the present invention wherein a coffee maker has interchangeable glass and thermal carafes, a water distribution system that disperses water more uniformly over the coffee grounds, a rotating grounds basket that minimizes overflow of the coffee grounds, and a serial heating system that minimizes the flow of unheated brew water over the grounds. In an alternative embodiment, the coffee maker includes a batch heating system allowing for easy replacement of the distributor.

More specifically in a first aspect of the invention, the coffee maker includes a glass carafe and a thermal carafe, both of which fit interchangeably within the carafe cavity of the coffee maker. The coffee maker further includes a carafe heating element or surface upon which the thermal and glass carafes rest when one of the carafes is in position within the carafe cavity. A sensor or switch on the coffee maker unit senses whether the glass carafe or the thermal carafe is within the cavity. When the glass carafe is within the cavity, the heating surface under the carafe is activated to maintain the temperature of the brewed coffee. When the thermal carafe is sensed within the carafe cavity, the heating surface is not activated.

In a second aspect, the coffee maker includes a serial water heating system that maximizes the amount of brew water that is heated in the desired temperature range of 195°–205° Fahrenheit. The heating system includes a water flow pipe, a portion of which is adjacent to a heating element, and a control system. The heating element is activated by the control system at the beginning of the brew cycle for a short time. The heating element is then deactivated for a short time. This allows the heated portion of the brew water to transfer heat to the unheated brew water downstream of the heating element without causing the downstream water to be dispersed over the coffee grounds. The control system then re-activates the heating element for the remainder of the brewing cycle, causing vaporized and then condensed water to be driven through the system and deposited on the coffee grounds In a third aspect, the coffee maker includes a showerhead for dispersing the heated brew water over the coffee grounds at a variety of radially distinct locations. As disclosed, the showerhead includes a descending trough, the upper end of which is connected to an outflow end of the water flow pipe. The heated brew water enters the showerhead and flows toward its lower end. The showerhead contains several holes radially spaced above a centrifugal grounds basket. The heated water flows through these holes and is deposited on several discrete radially spaced locations on the coffee grounds contained in the centrifugal basket. As the basket spins, the water is driven by gravity and centrifugal forces through the grounds, thus evenly wetting the grounds. Additionally, the showerhead is easily accessible by a user to manually remove lime accumulation from the trough and holes so that the flow of the brew water is not impeded.

In a fourth aspect of the invention, an improved rotating grounds basket allows for a greater grounds capacity while producing an optimal flavored coffee using relatively low speed centrifugal extraction. At the lowered speed, the grounds and water slurry does not climb the walls of the basket, thus reducing overflow of the slurry. Several relatively large vertical ports are positioned within the basket walls to allow the coffee to easily escape the basket. The ports extend to the bottom of the basket so that the angular velocity need only be sufficient to thoroughly wet the grounds and force the slurry against the lower portion of the basket walls. The radial dispersal of the water by the showerhead over the grounds allows the water to initially contact a large portion of the grounds, thus extracting a maximum of the coffee flavor in a minimal amount of time. Thus, in the improved basket, the slurry need not climb the walls nor exit through small ports to provide sufficient contact time between the water and grounds. The basket is spun relatively slowly, preferably at 100–150 rpm, so that the slurry does not climb the walls, and the slower speed allows for sufficient contact time between the grounds and water prior to the coffee's exiting the basket through the side ports.

In an alternative embodiment of this invention, the coffee maker may have a batch heating system in which all of the brewing water is heated prior to beginning the brewing process. A water heating chamber holds and heats the brew water, which is then released through a modular distributor positioned on the bottom of the chamber. This modular distributor may be easily removed by hand for cleaning or replacement. This overcomes the need to replace the entire coffee maker.

These and other objects, advantages, and features of the invention will be more readily understood and appreciated by reference to the detailed description of the preferred embodiment and the drawings.

BRIEF DESCRIPTION OF THE DRAWINGS

FIG. 23 is a bottom perspective view of the heating chamber of the alternative coffee maker showing the underside of the modular distributor;

FIG. 25 is a fragmentary cross-sectional view of an alternative embodiment of the modular distributor;

FIG. 26 is a bottom perspective view of the alternative modular distributor;

FIG. 27 is a top fragmentary perspective view of the alternative modular distributor shown installed within the heating chamber;

FIG. 28 is a schematic of the water flow into the basket.

DETAILED DESCRIPTION OF THE PREFERRED EMBODIMENT

I. Overview

Figure 1:
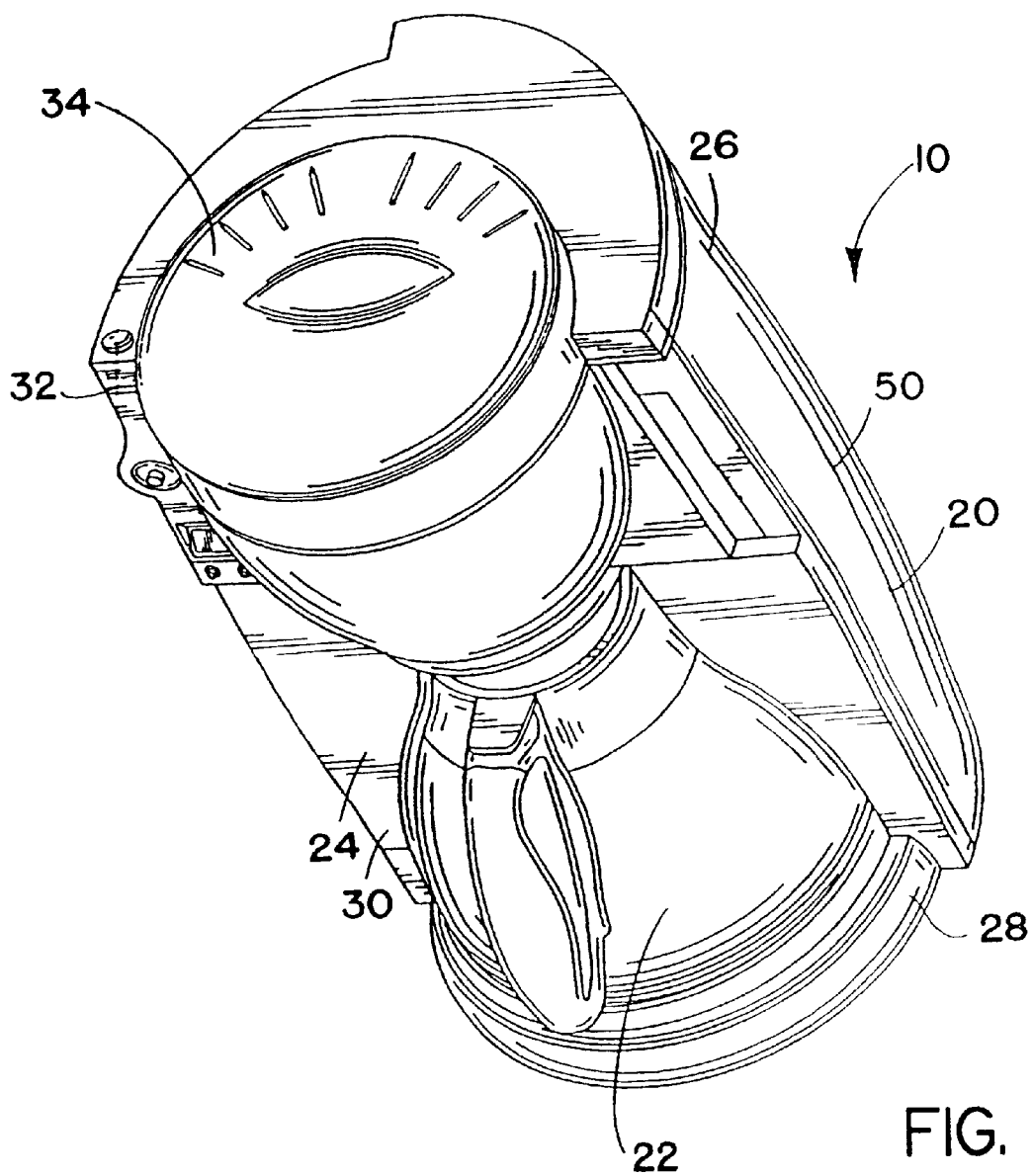
FIG. 1 is a perspective view of the coffee maker.

Referring to FIG. 1, there is illustrated a preferred embodiment of a coffee maker 10 including a counter top unit 20 and at least one carafe 22.

The counter top unit 20 has front and rear sides 24 and 26, a base 28, lower and upper portions 30 and 32, and a removable lid 34. The countertop unit 20 is comprised of a housing 50, a water heating system 52, a brewing assembly 54, a collection system 56, and a control system 58.

Figure 2:
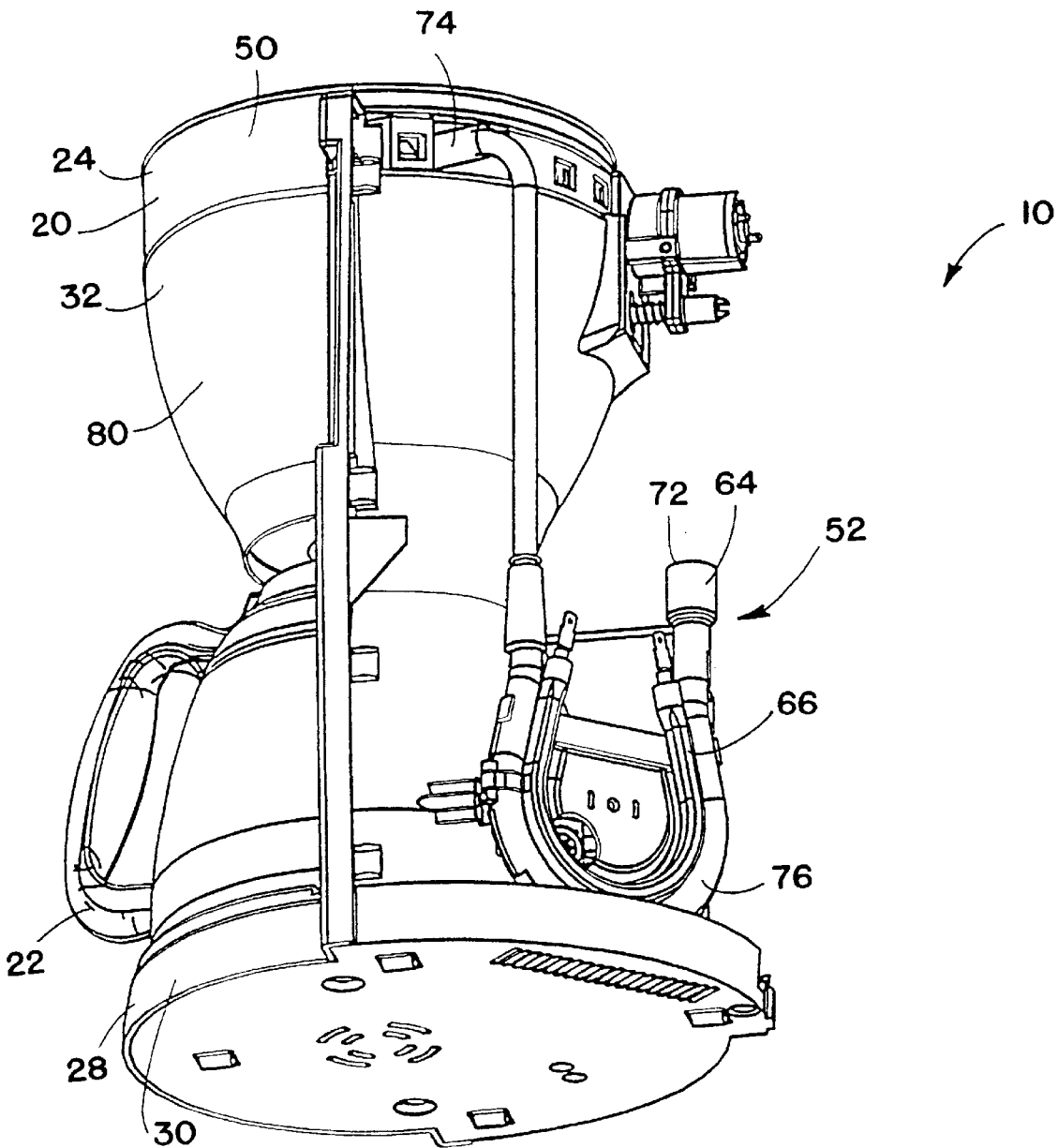
FIG. 2 is a bottom perspective of the coffee maker with its housing and water tank removed.
Figure 3:
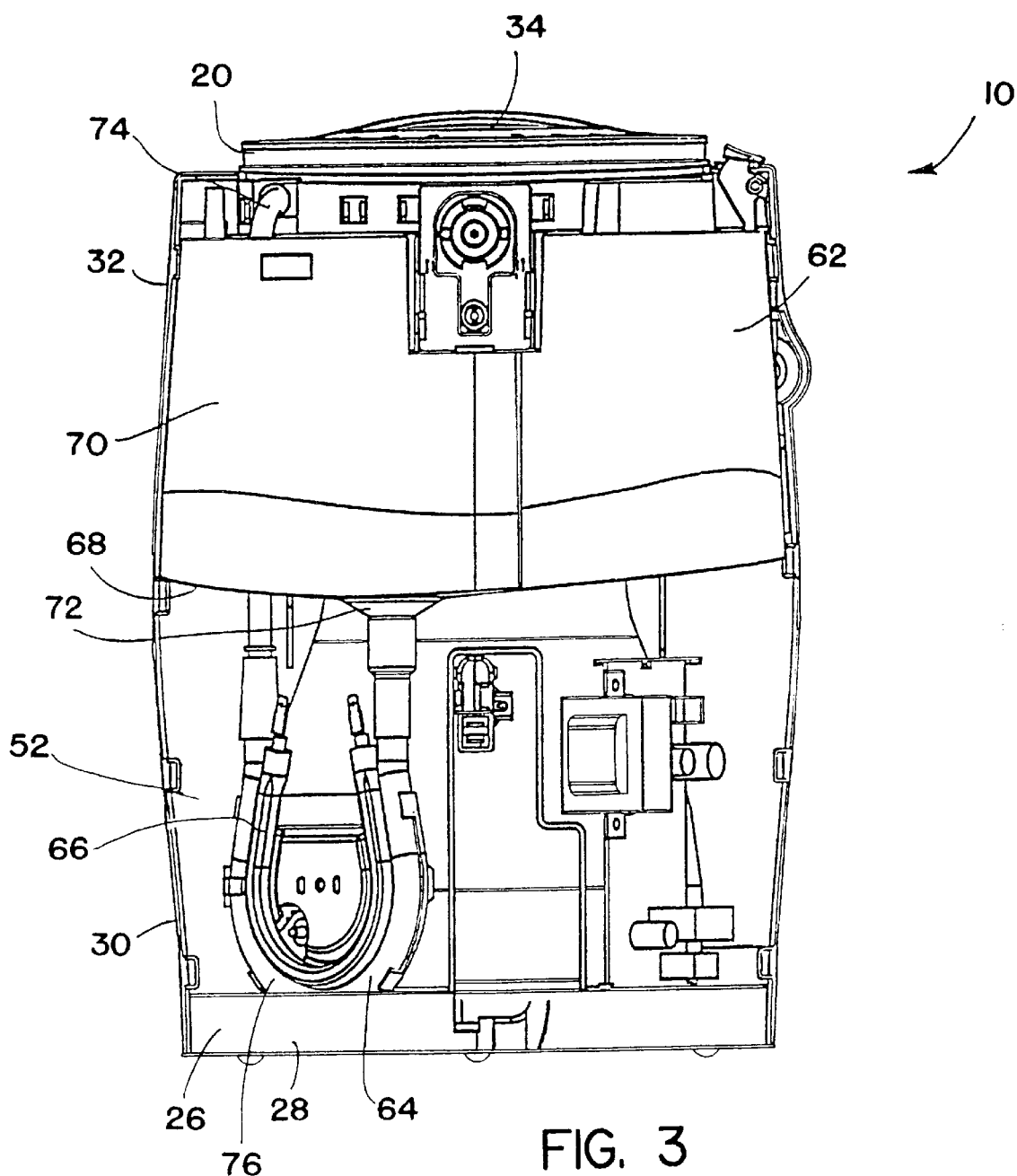
FIG. 3 is a rear view of the coffee maker with its housing removed.
Figure 4:
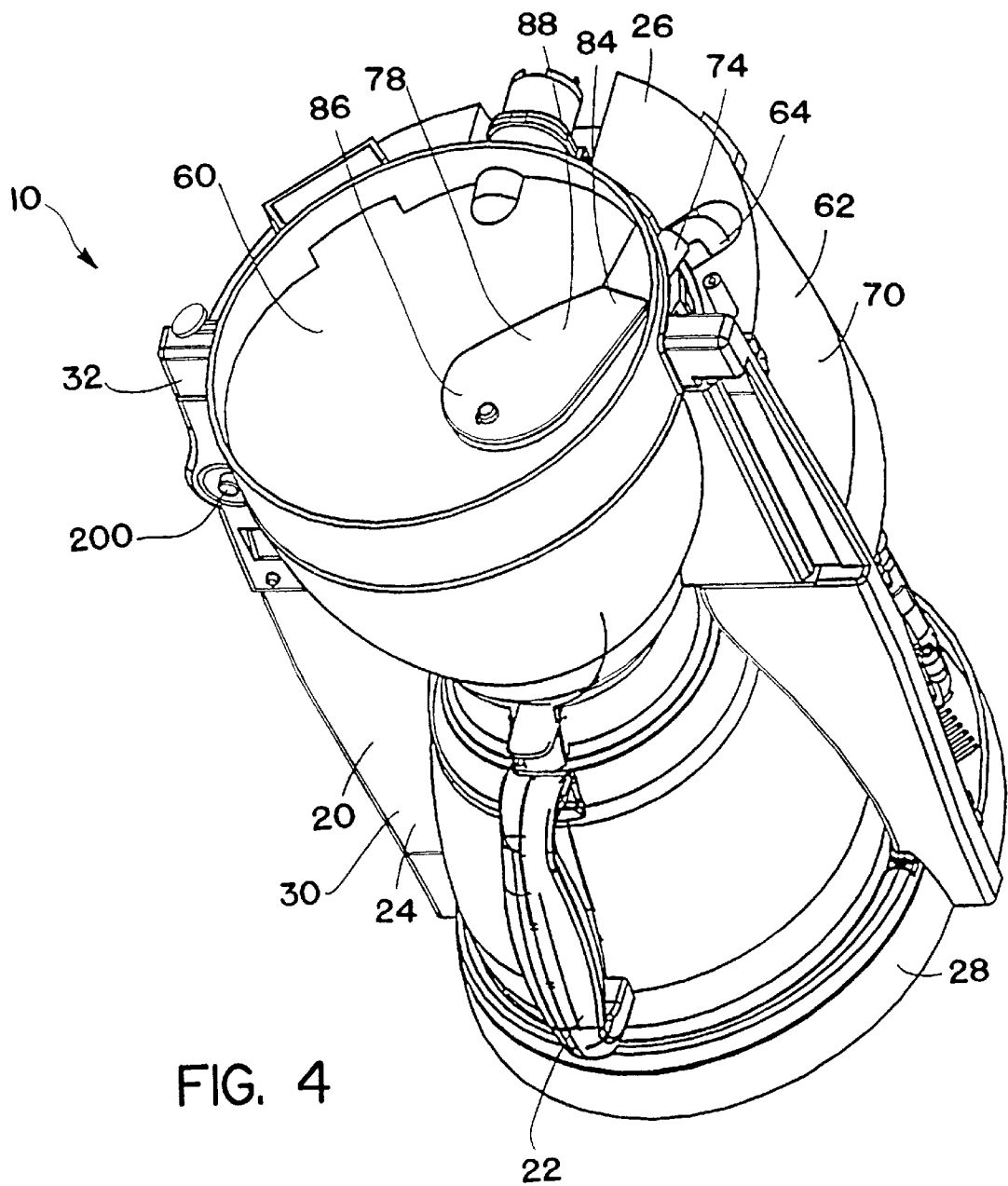
FIG. 4 is a top perspective view of the coffee maker with its housing and lid removed.

As seen in FIGS. 2–4, the water heating system 52 is positioned at the rear 26 of the counter top unit 20. The water heating system 52 comprises a funnel region 60, a storage tank 62, a water flow pipe 64, and a heating element 66. A large open space located directly under the lid 34 forms the funnel region 60. This region 60 receives the brew water when it is initially poured into the unit 20 by a user. The funnel region 60 is in fluid communication with the storage tank 62. The storage tank 62 has a bottom 68 and sides 70 extending upwardly therefrom and is preferably formed of plastic. An aperture (not shown) through which the water exits the storage tank 62 is defined by the bottom 68. The water flow pipe 64, which has an inflow and an outflow portion 72 and 74 and a heating portion 76, is attached by the inflow portion 72 to the storage tank 62 at the aperture. The inflow portion 72 is also preferably formed of plastic. A valve (not shown), preferably a check valve, is positioned in the inflow portion 72 and controls the flow of water out of the storage tank 62 and into the flow pipe 64. Preferably, the valve does not regulate the rate of flow of water out of the tank 62 but allows water to flow freely; the valve does, however, prevent any backflow of water into the storage tank 62.

The heating portion 76 of the flow pipe 64 forms a general U-shape on the rear 26 of the counter top unit 20. The heating element 66 is also formed in a general U-shape and is adjacent to the heating portion 76. Both the heating element 66 and the heating portion 76 of the flow pipe 64 are preferably manufactured of aluminum to facilitate heat transfer. The outflow portion 74 of the flow pipe 64 extends from the heating portion 76 and is preferably manufactured of silicone to withstand the elevated temperature of the brew water after it passes through the heating portion 76.

Figure 5:
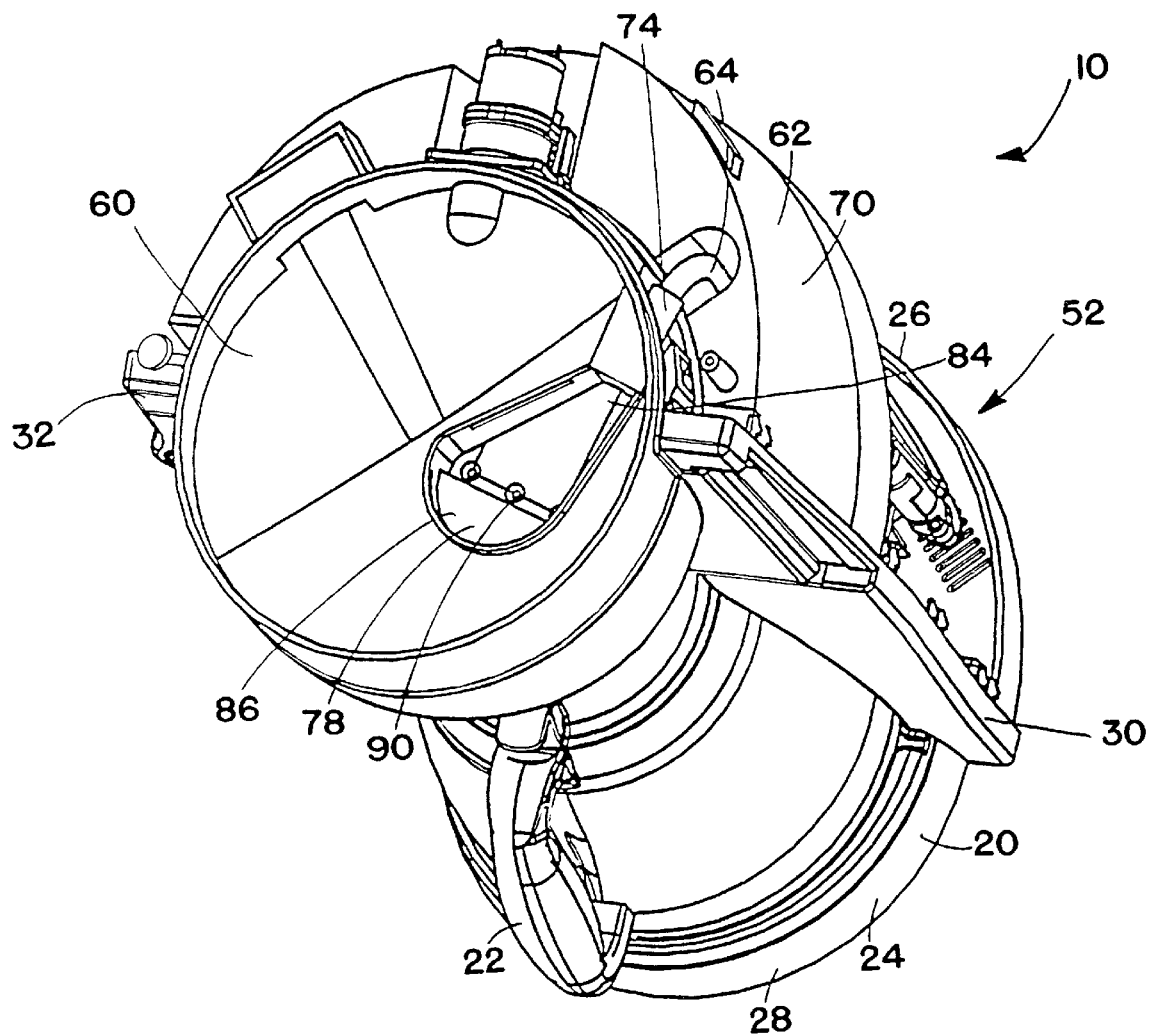
FIG. 5 is a top perspective view of the coffee maker with the lid, showerhead cap and the housing removed.

Referring now to FIGS. 5–8, the brewing assembly 54 comprises a showerhead 78, a basket assembly 80, and a drive system 82. The showerhead 78, as seen in FIG. 5, has upper and lower ends 84 and 86, the upper end 84 attached to and in fluid communication with the outflow end 74 of the flow pipe 64 to receive the heated brew water. The showerhead 78, which is trough-shaped, is located directly below the removable lid 34 for ease of access and extends upwardly into the funnel region 60. A cap 88 mounts in a snap-fit manner over the trough to minimize overflow of the heated water from the showerhead 78. However, if the water overflows the trough, it escapes under the cap 88 and overflows into the funnel region 60, from which it flows back into the storage tank 62. Additionally, the cap 88 is removable by a user to facilitate cleaning of the showerhead 78 to prevent lime accumulation. The showerhead 78 is angled downwardly to allow water to flow towards its lower end 86. Located in the lower end 86 of the showerhead 78 are a plurality of apertures 90 spaced radially outwardly from the center of the brewing assembly 54 for distributing the heated water over the coffee grounds.

Figure 6:
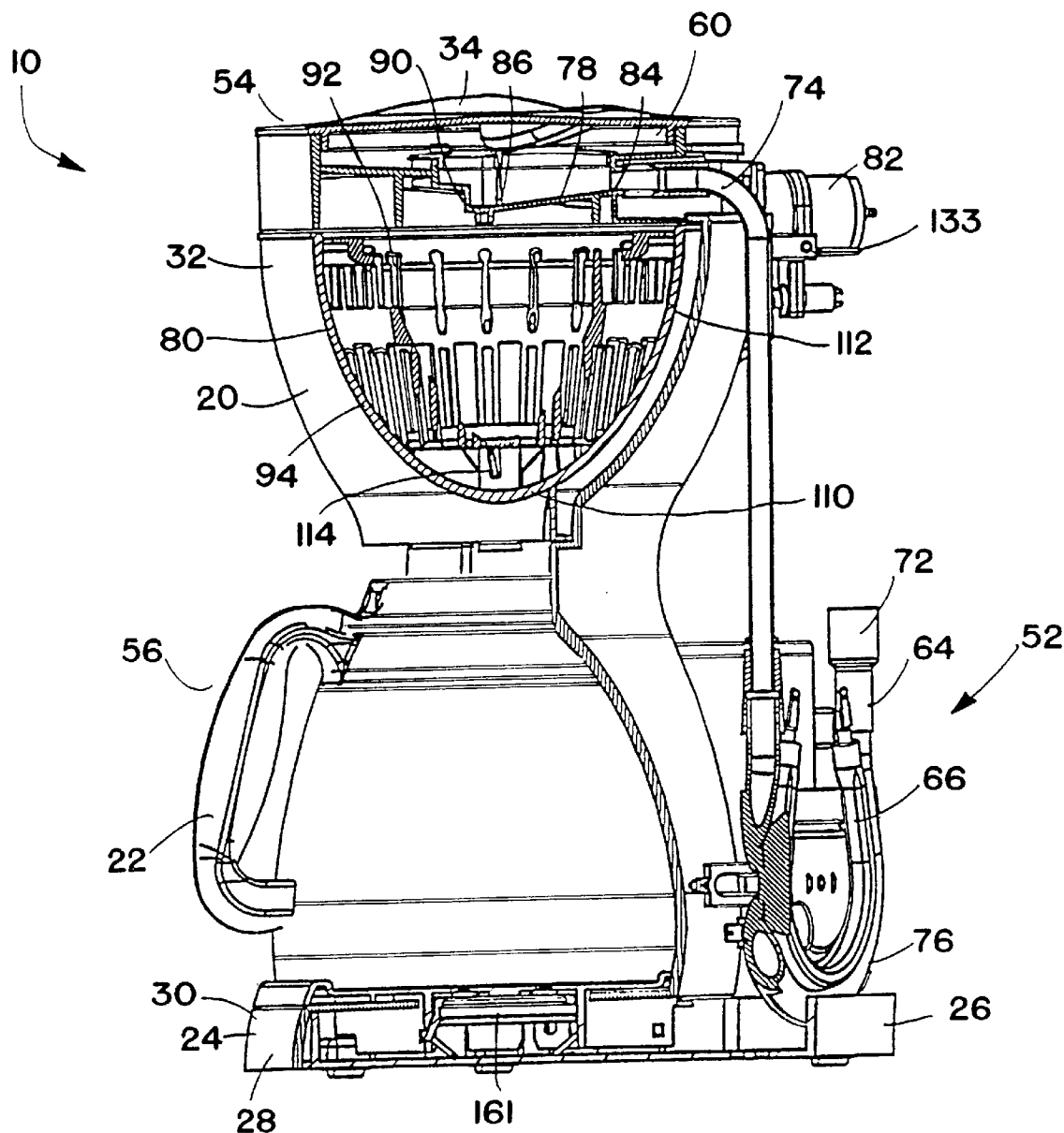
FIG. 6 is a cross-sectional view of the coffee maker.
Figure 7:
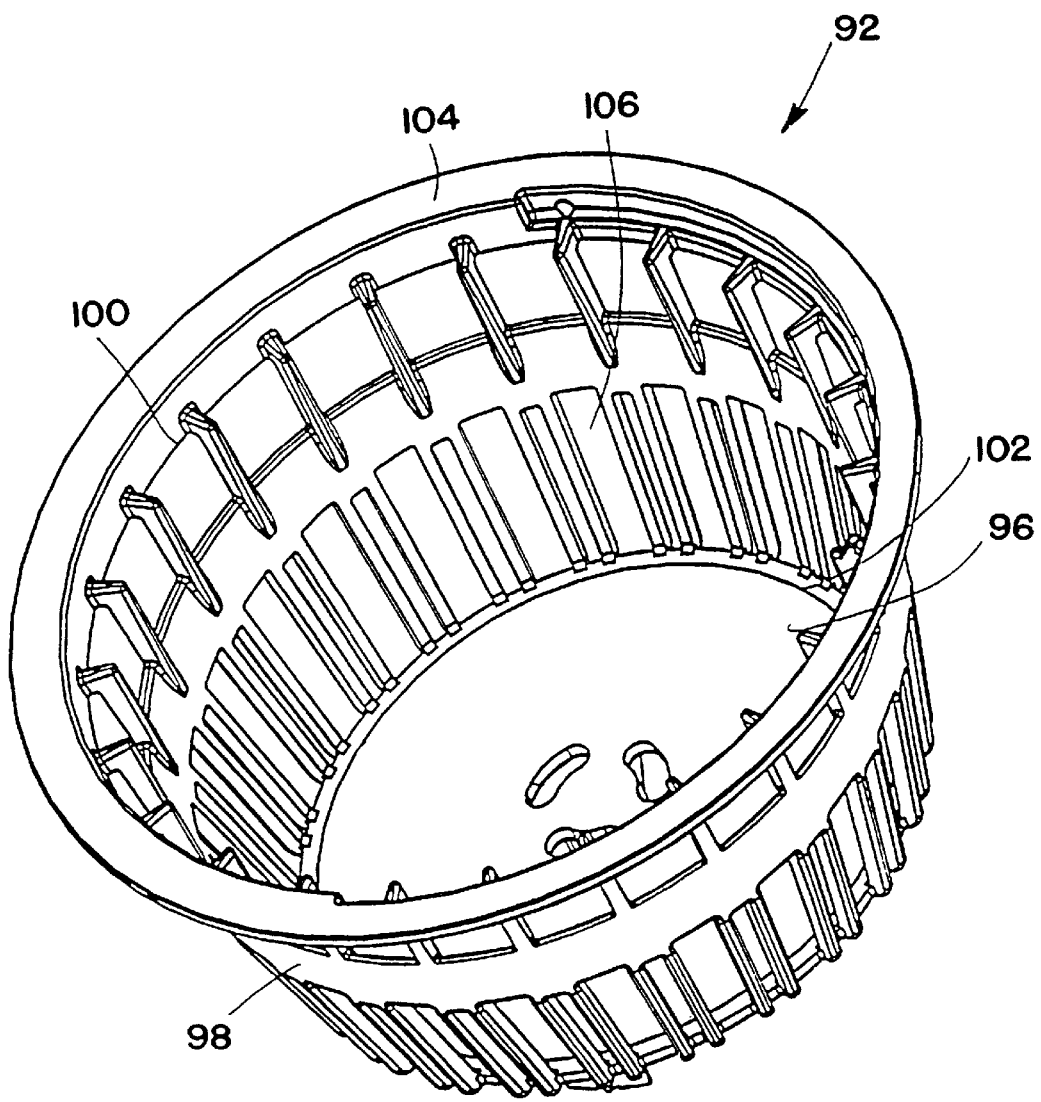
FIG. 7 is a perspective view of the centrifugal basket.
Figure 8:
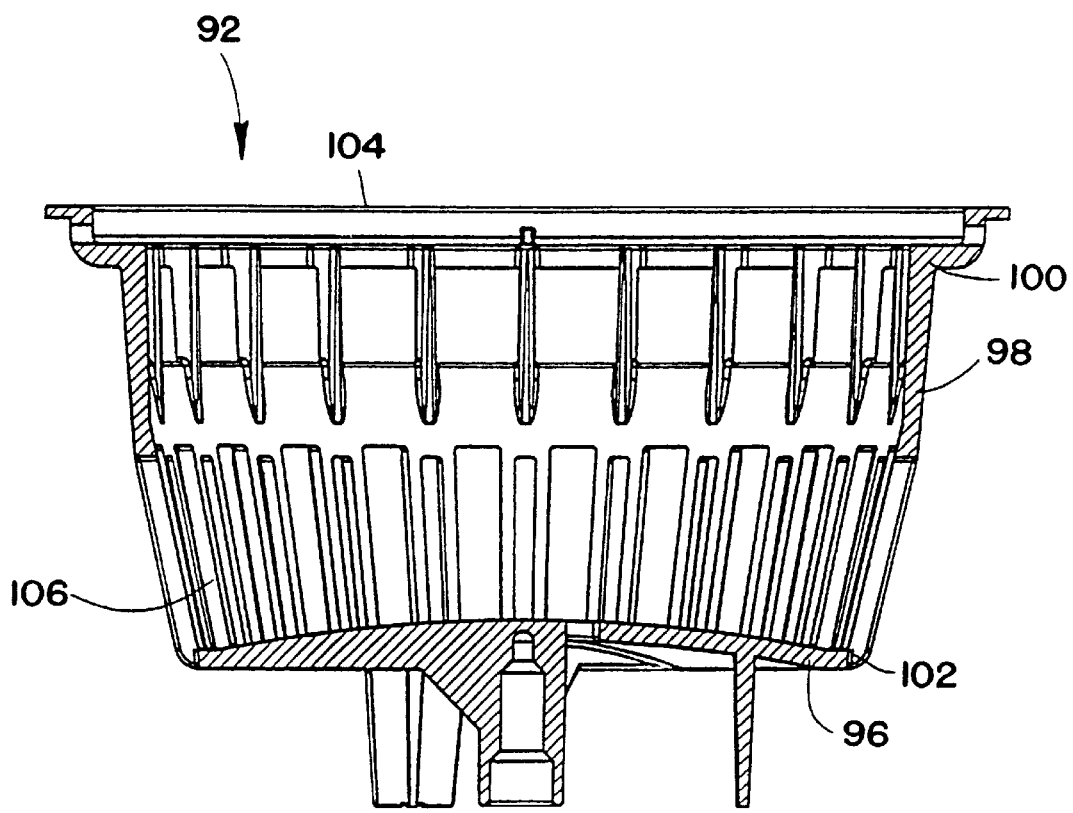
FIG. 8 is a cross-sectional view of a centrifugal basket.

As seen in FIG. 6, the basket assembly 80 is positioned under the showerhead 78. The basket assembly 80 is comprised of a centrifugal basket 92 and a stationary collection basket 94. Centrifugal basket 92 rotates within stationary collection basket 94 during the brewing cycle. As seen in FIGS. 6–8, the centrifugal basket 92 has a bottom 96 and angled sides 98 extending upwardly therefrom, the sides 98 having upper and lower edges 100 and 102. Extending outwardly from the upper edge 100 of the sides 98 is a basket rim 104. The sides 98 include a plurality of circumferentially-spaced, vertically-extending side ports 106 through which the brewed coffee exits the centrifugal basket 92. The ports 106 extend to the lower edge 102 of the sides 98 to allow the brewed coffee to easily exit the basket 92.

The basket 92 preferably is operated at an angular velocity of 100–150 rpm, and most preferably at 130 rpm. At this angular velocity, the grounds and water slurry does not escape above upper edge 100. The basket 92 preferably has a radius of 2.25 inches at a point on the lower edge 102 of the side walls 98. At this lower velocity, the water is in contact with the grounds for a sufficient time to fully extract the flavor before exiting the basket 92 through the vertical ports 106. Additionally, the basket 92 is spinning sufficiently to move the water radially through the grounds towards the side walls 98 and the vertical ports 106. The slurry achieves an equilibrium profile which does not allow the slurry to reach upper edge 100.

As seen most clearly in FIG. 6, the collection basket 94 also includes a bottom 110 and upwardly extending sides 112. The collection basket 94 is hingedly attached to the housing 50 of the coffee maker unit 20, allowing it and the nested centrifugal basket 92 to swing away from the coffee maker unit 20 for a user to insert a filter and coffee grounds into the centrifugal basket 92. The bottom 110 of the collection basket 94 includes a central spindle 114 extending upwardly and two ports (not shown) through which the coffee exits the basket assembly 80. The bottom 96 of the centrifugal basket 92 interfits with the spindle 114 (as seen most clearly in FIG. 12), as seen most clearly in FIGS. 6 and 8, to rotatably secure the centrifugal basket 92 to the collection basket 94.

Figure 9:
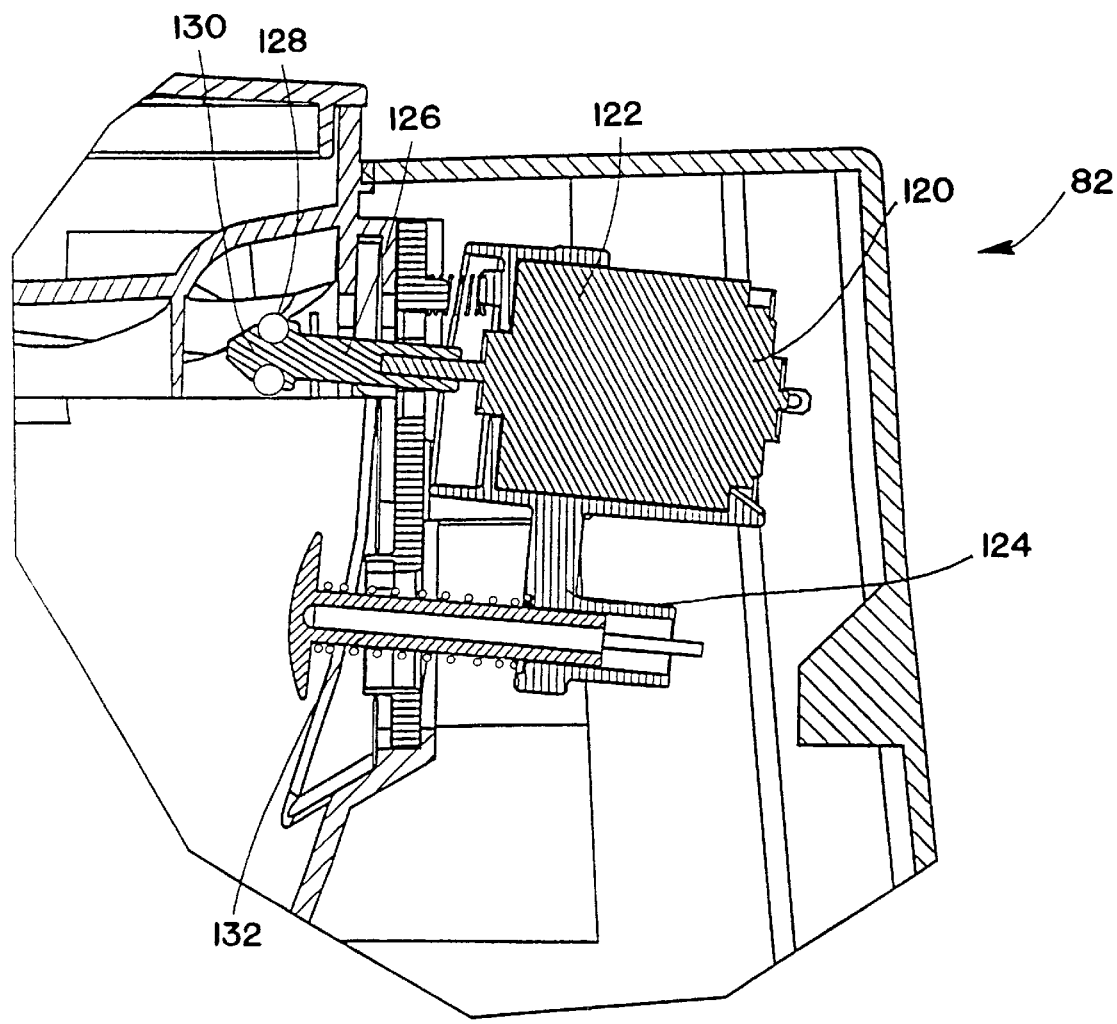
FIG. 9 is an enlarged fragmentary cross-sectional view of the coffee maker without the collection basket illustrating a drive mechanism.
Figure 10:
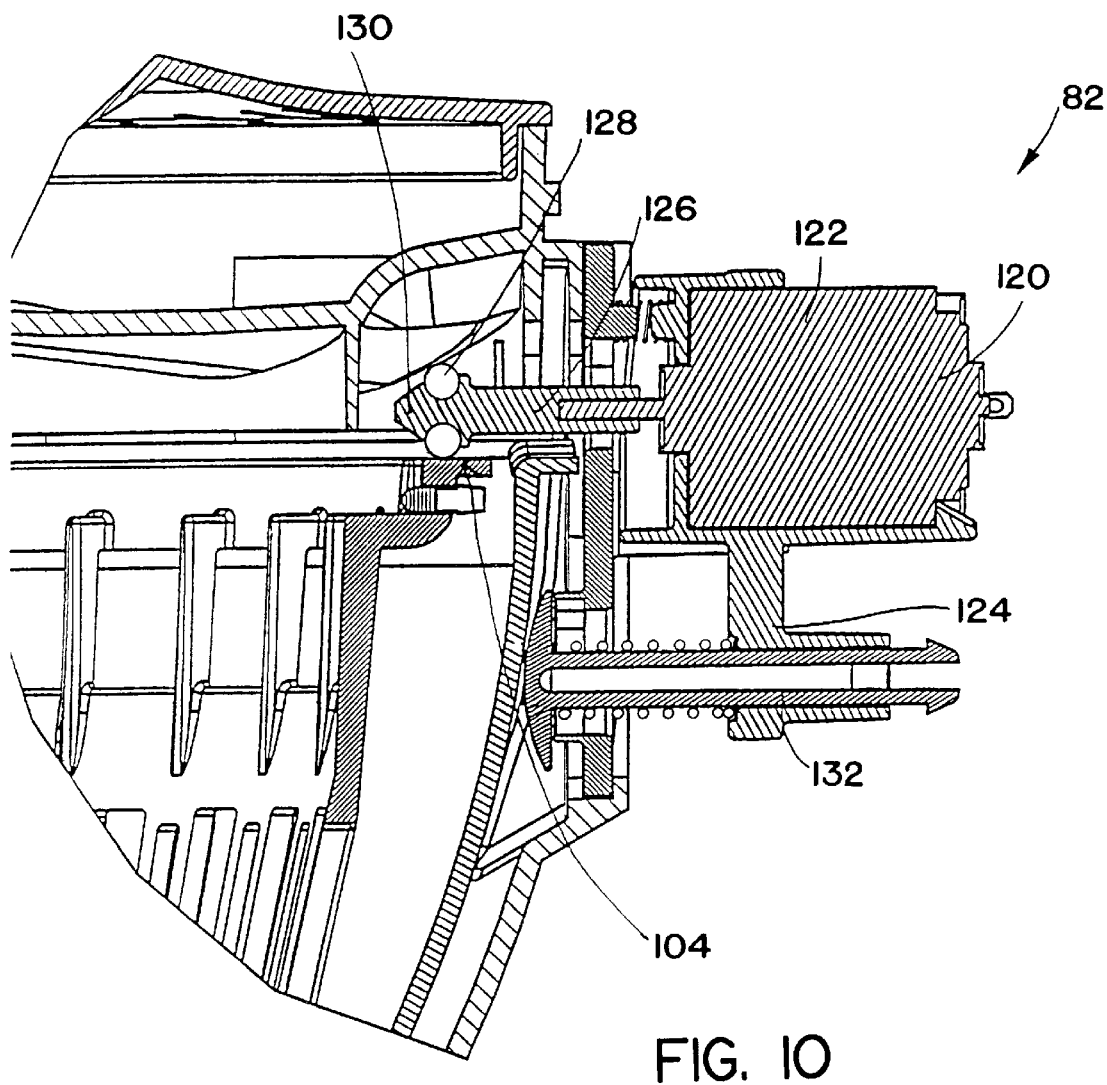
FIG. 10 is an enlarged fragmentary cross-sectional view of the coffee maker with the collection basket in place.

Referring now to FIGS. 9 and 10, the brewing assembly 54 further includes drive system 82. The drive system 82 includes a drive motor 120 having upper and lower portions 122 and 124 located within the housing 50 and positioned adjacent the basket assembly 80 (as seen in FIG. 6). Extending from the upper portion 122 of the drive motor 120 is a rotatable drive shaft 126 fitted with an O-ring 128 on its free end 130. As seen in FIG. 10, when the centrifugal and collection baskets 92 and 94 are positioned within the coffee maker unit 20, the O-ring 128 rests upon the rim 104 of the centrifugal basket 92. The drive motor 120 turns the shaft 126 which, in turn, rotates the O-ring 128 and spins the centrifugal basket 92. Extending from the lower portion 124 of the drive motor 120 is a spring-loaded plunger 132 which, when the collection and centrifugal baskets 92 and 94 are positioned within the coffee maker unit 20, contacts the collection basket 94. The drive motor 120 is suspended within the housing 50 by two pins 133, as seen most clearly in FIG. 6, about which the drive motor 120 may pivot. When the basket assembly 80 is within the coffee maker unit 20 and contacting the plunger 132, the plunger 132, from its spring actuation, absorbs a portion of the force from the basket assembly 80; the remainder of the force pushes the plunger 132 linearly, thus pivoting the drive motor 120. The shaft 126 and O-ring 128 then rotate downwardly, positioning the O-ring 128 against the rim 104 of the centrifugal basket 92. The plunger's absorption of a portion of the forces as a result of its spring-loading allows the O-ring 128 to rest on the rim 104 with minimal downward pressure.

Figure 11:
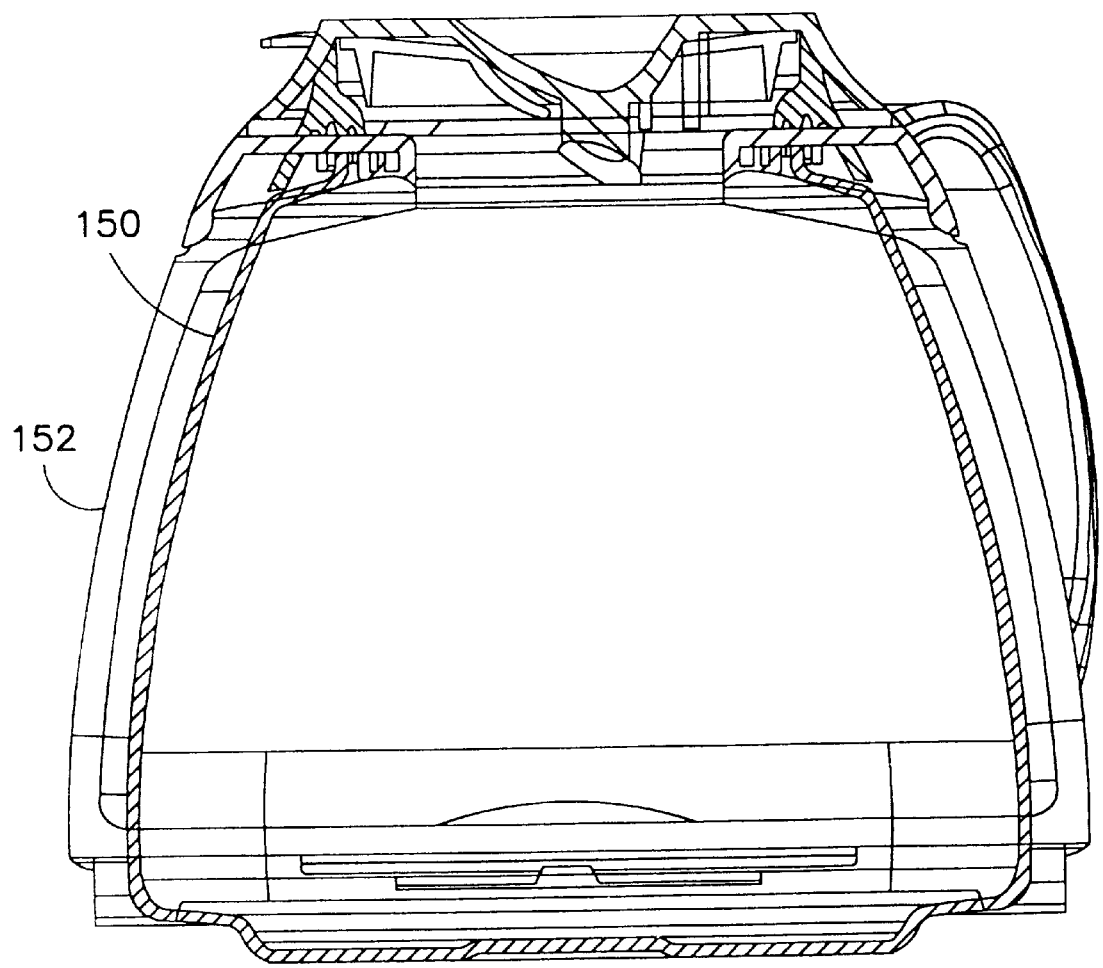
FIG. 11 is an overlay of the profiles of the glass and thermal carafes for use with the coffee maker.
Figure 12:
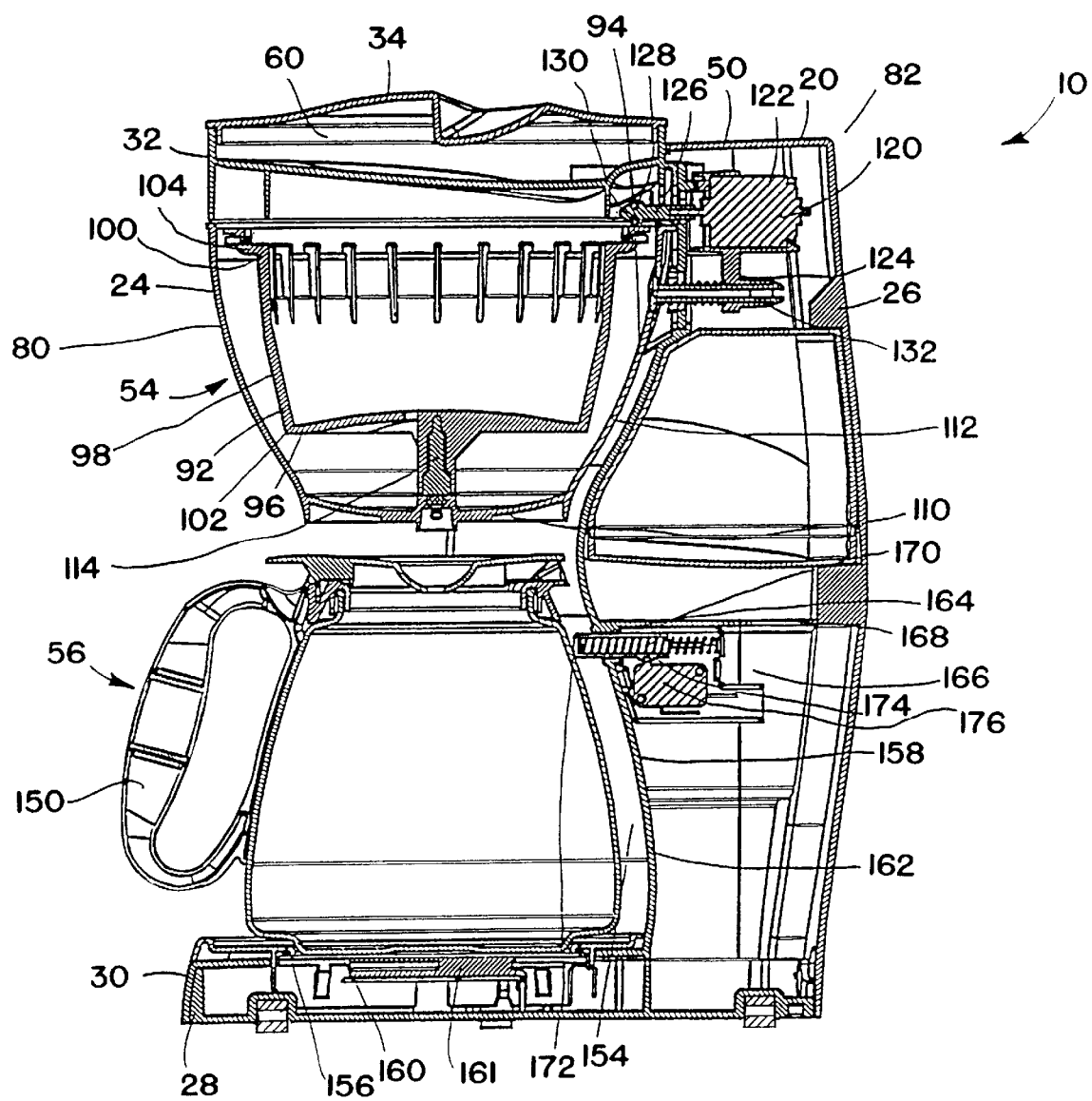
FIG. 12 is a cross-sectional view of the coffee maker showing the glass carafe in the carafe cavity.
Figure 13:
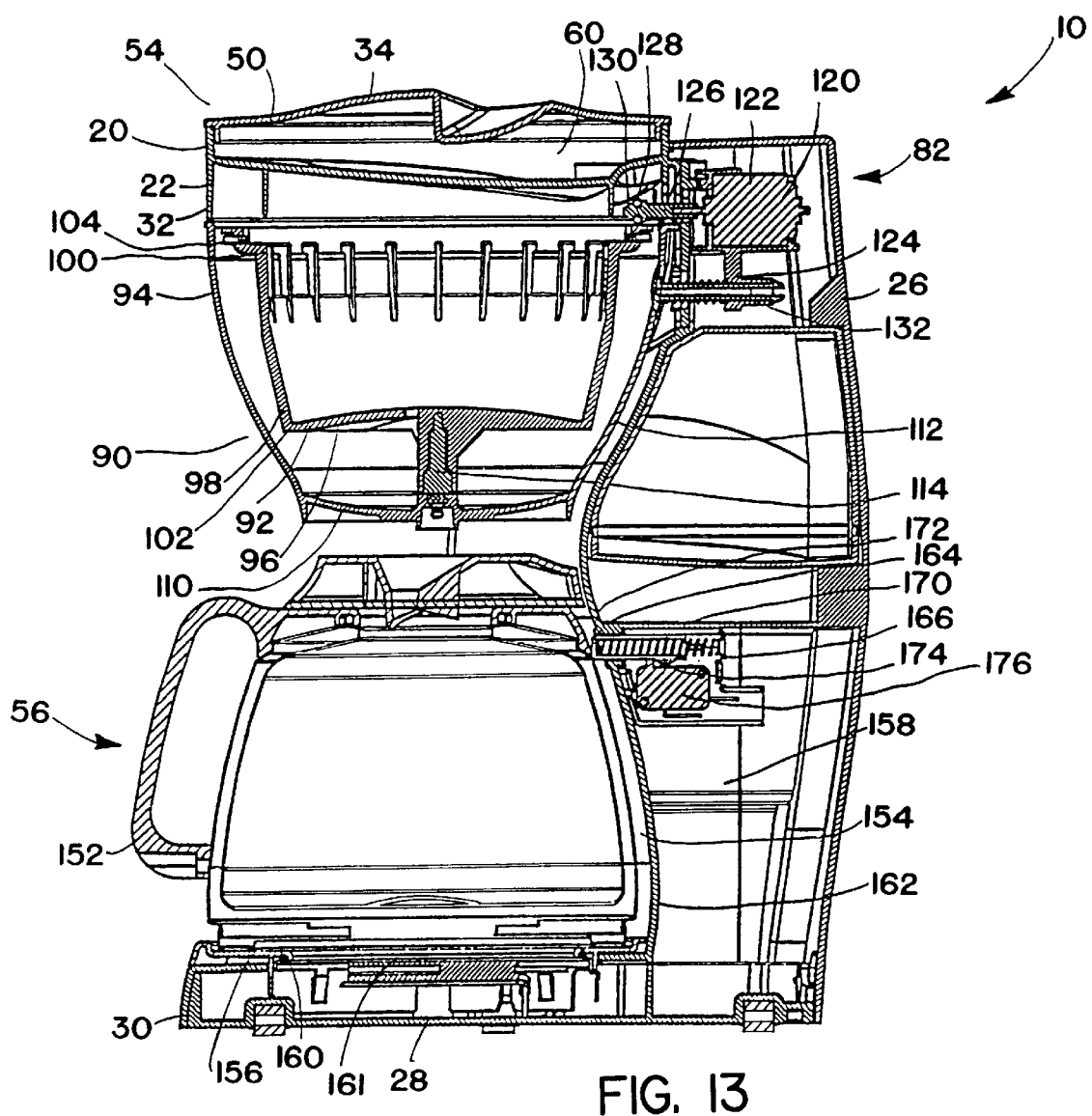
FIG. 13 is a cross-sectional view of the coffee maker showing the thermal carafe in the carafe cavity.

Referring now to FIGS. 11–13, the coffee maker 10 further includes a collection system 56 comprised of two carafes, a glass or plastic carafe 150 and a thermal carafe 152. Both carafes 150 and 152 fit individually within a carafe cavity 154 of the coffee maker unit 20; the carafe cavity has a bottom 156 and upwardly extending sides 158. A carafe heating plate 160 forms the bottom 156 of the cavity 154, and both carafes 150 and 152 rest upon the heating plate 160 when either is within the cavity 154. A rectangular shaped heating element 161 is disposed beneath heating plate 160 to supply heat to heating plate 160 and the carafe resting on the heating plate 160. One side 162 of the cavity 154 defines an aperture 164 through which a carafe sensor 166 extends into the cavity 154. The sensor 166 is preferably comprised of a spring-actuated plunger 168 having a shaft 170 and a contact end 172. The plunger 168 includes a ramp 174 extending from the shaft 170 which, as the plunger 168 retracts within the wall 162 of the carafe cavity 154, contacts a switch 176 to activate the heating element 161.

As seen most clearly in FIG. 11, the thermal carafe 152 and the glass carafe 150 are provided with differing profiles. Each of the carafes 152 and 154 contacts the contact end 172 of the plunger 168 when it is placed within the carafe cavity 154; however, each carafe 152 and 154, due to their differing profiles, displaces the plunger 168 a different distance. As seen in FIG. 12, the glass carafe 150, having the smaller profile, displaces the plunger 168 a smaller distance than does the thermal carafe 152. When the glass carafe 150 is placed within the carafe cavity 154, it displaces the plunger 168 so that the ramp 174 is in contact with the switch 176, and the heating element 161 is activated. However, as seen in FIG. 13, when the thermal carafe 152 is placed within the carafe cavity 154, the plunger 168 is displaced a greater distance so that the ramp 174 is not in contact with the switch 176, and, thus, the heating element 161 is not activated. The ramp 174 briefly contacts the switch 176 as the plunger 168 is displaced by the thermal carafe 152; however, this momentary contact is insufficient to activate the heating element 161.

Figure 14:
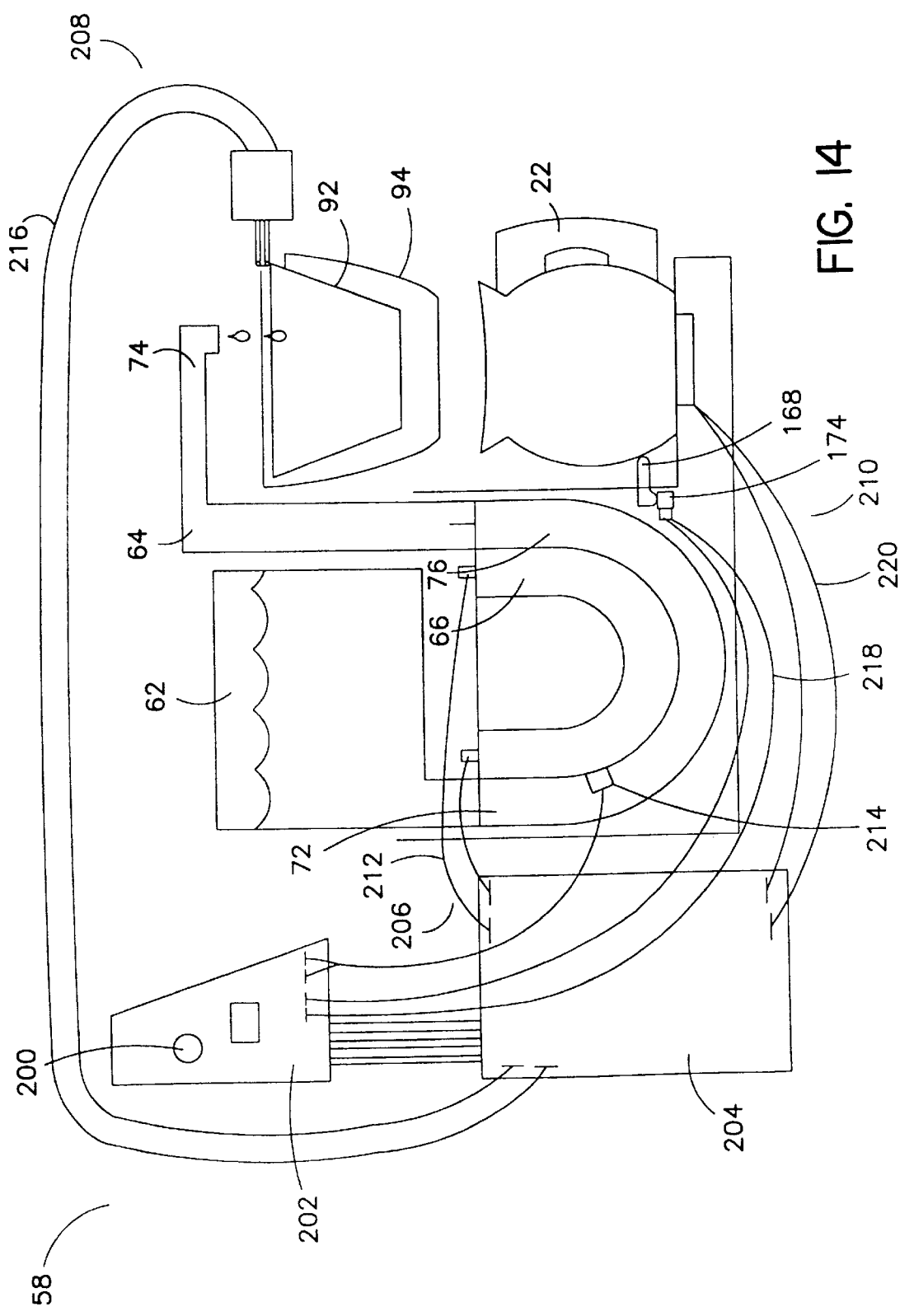
FIG. 14 is a schematic illustration of the control system for the carafe sensor.

As seen in FIG. 14, the coffee maker 10 further includes control system 58. The system 58 has a manually operated start button 200 located on the housing 50 of the counter top unit 20. The system 58 further includes a microprocessor 202 in electrical connection with a powerboard 204, water heating controls 206, motor controls 208, and maintenance heating controls 210. The water heating controls 206 include an electrical connection 212 between the heating element 66 and the powerboard 204 to control activation of the heating element 66. The microprocessor 202 directs power to the heating element 66 for the first seven seconds of the brew cycle, then deactivates the element 66 for eight seconds, allowing time for heat transfer from the heated water to the downstream unheated water. Then the microprocessor 202 switches the heating element 66 back on. A thermistor 214 is positioned adjacent to the heating element 66 to monitor the temperature of the element 66; drastic temperature increases in the heating element 66 indicate that no brew water is present in the flow pipe 64 to absorb the heat from the element 66. When the thermistor 214 detects such a temperature increase, the microprocessor 202 cuts the power to the heating element 66, and the brew cycle ends.

The motor control 208 comprises an electrical connection 216 between the drive motor 120 and the powerboard 204 to control activation of the motor 120. The microprocessor 202 directs power to the motor 120 to spin the centrifugal basket 92. The motor 120 is activated after the eight second deactivation of the heating element 66 and continues spinning for the remainder of the brew cycle. Immediately after the brew cycle, the basket 92 is spun an additional twenty seconds at an accelerated speed, known as the "dry spin," to extract the remaining coffee from the water and grounds slurry. Then the microprocessor 202 cuts all power to the drive motor 120.

The maintenance heating control 210 comprises an electrical connection 218 between the switch 176 and the microprocessor 202 and an electrical connection 220 between the heating element 161 and the powerboard 204. The microprocessor 202 monitors the switch 176 for at least five seconds of activation. Thus, the momentary activation caused by the insertion of the thermal carafe 152 into the cavity 154 is ignored by the microprocessor 202. After five seconds of activation, the microprocessor 202 directs power from the powerboard 204 to the heating element 161 to maintain the coffee temperature in the glass carafe 150. The heating surface 160 remains activated for two hours after completion of the brew cycle unless the element 161 is deactivated by removal of the glass carafe 150 or until the coffee maker 10 is turned off. The microprocessor 202 cuts power to the heating element 161 if the glass carafe 150 is removed from the cavity 154; however, if the carafe 150 is returned to the cavity 154 within the two hour period, the heating element 161 is reactivated.

Figure 15:
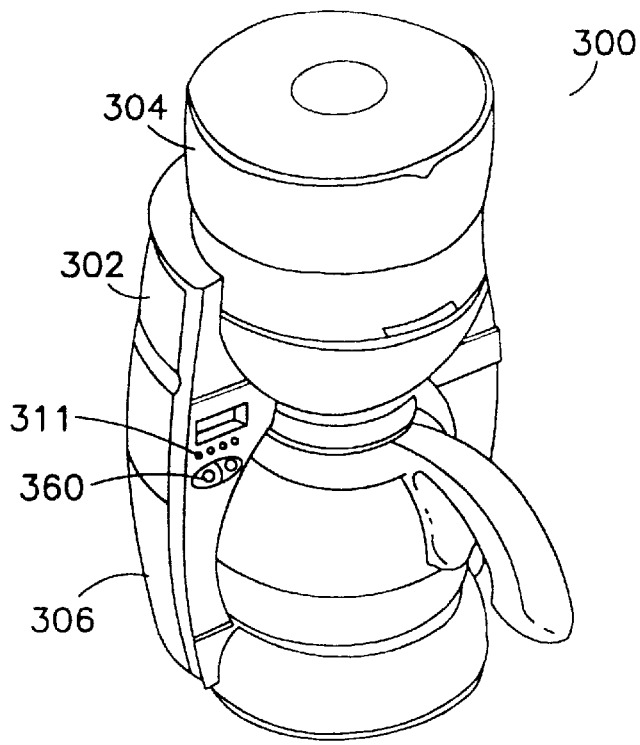
FIG. 15 is a perspective view of an alternative coffee maker.

An alternative embodiment of the coffee maker 300 is seen in FIG. 15. The alternative embodiment 300 comprises a countertop unit 302 having top and bottom portions 304 and 306. The counter top unit 302 includes a batch water heating system 308, a basket assembly 309, and a control system 311.

Figure 16:
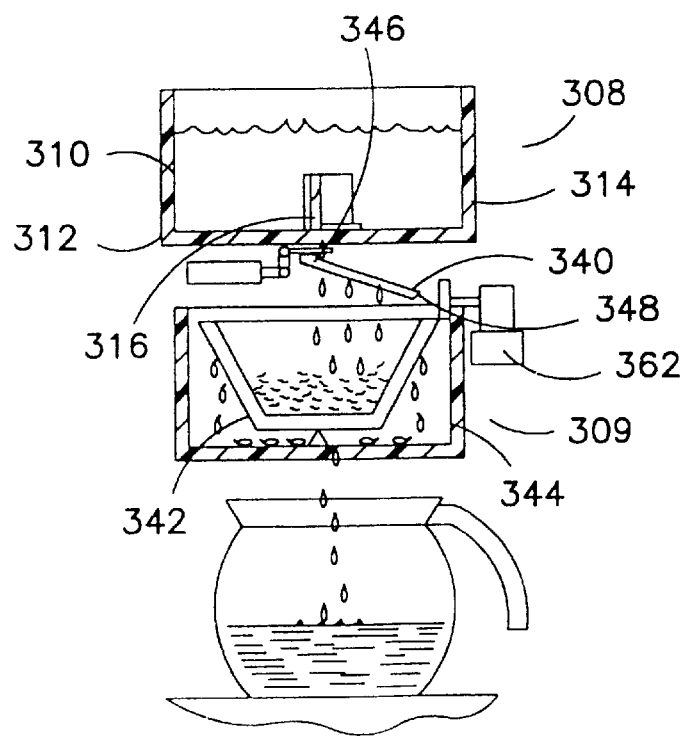
FIG. 16 is a schematic illustration, partially cutaway, showing the flow of the water through the alternative coffee maker.
Figure 17:
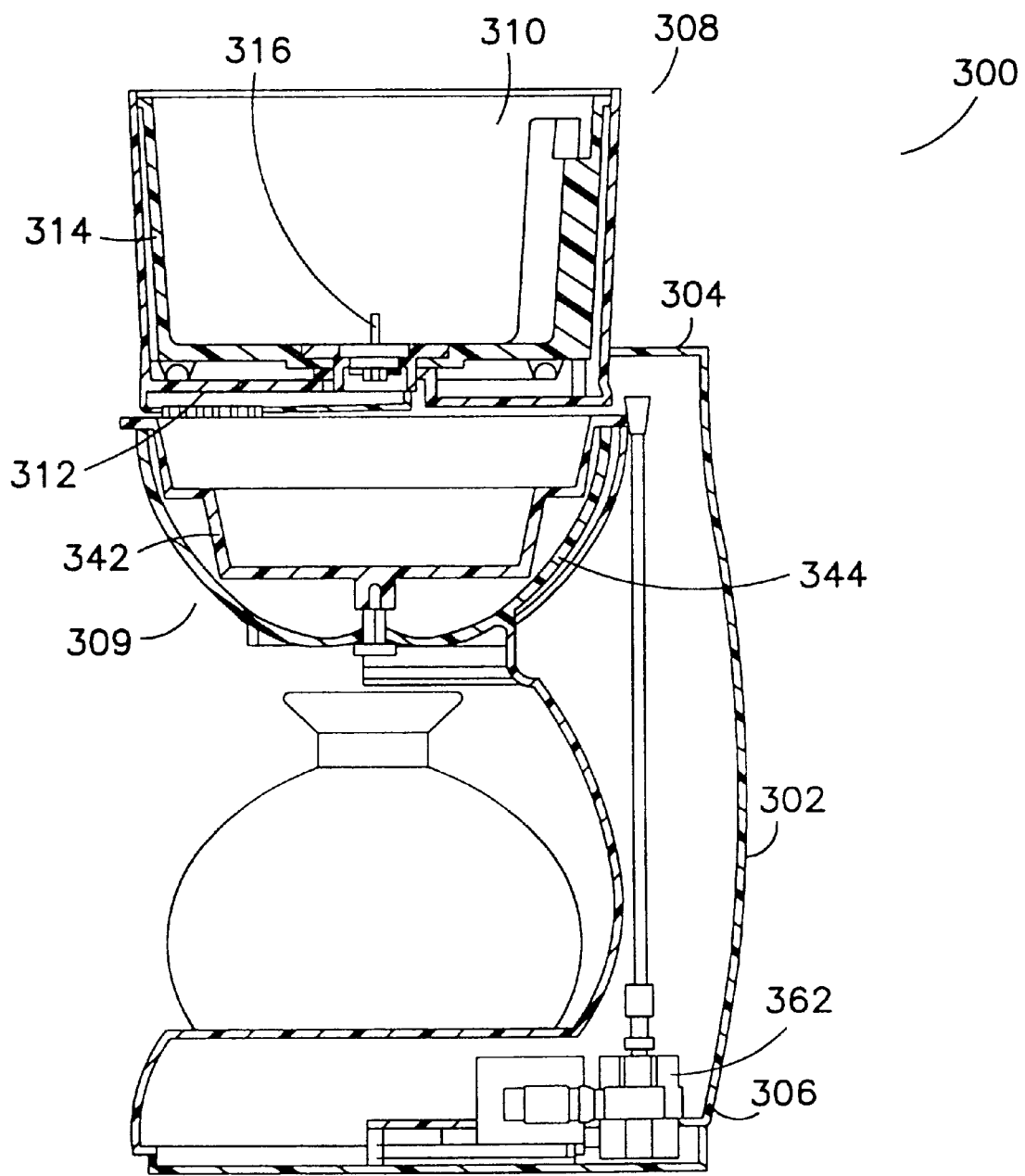
FIG. 17 is a right side partial cross-sectional view of the alternative coffee maker.
Figure 18:
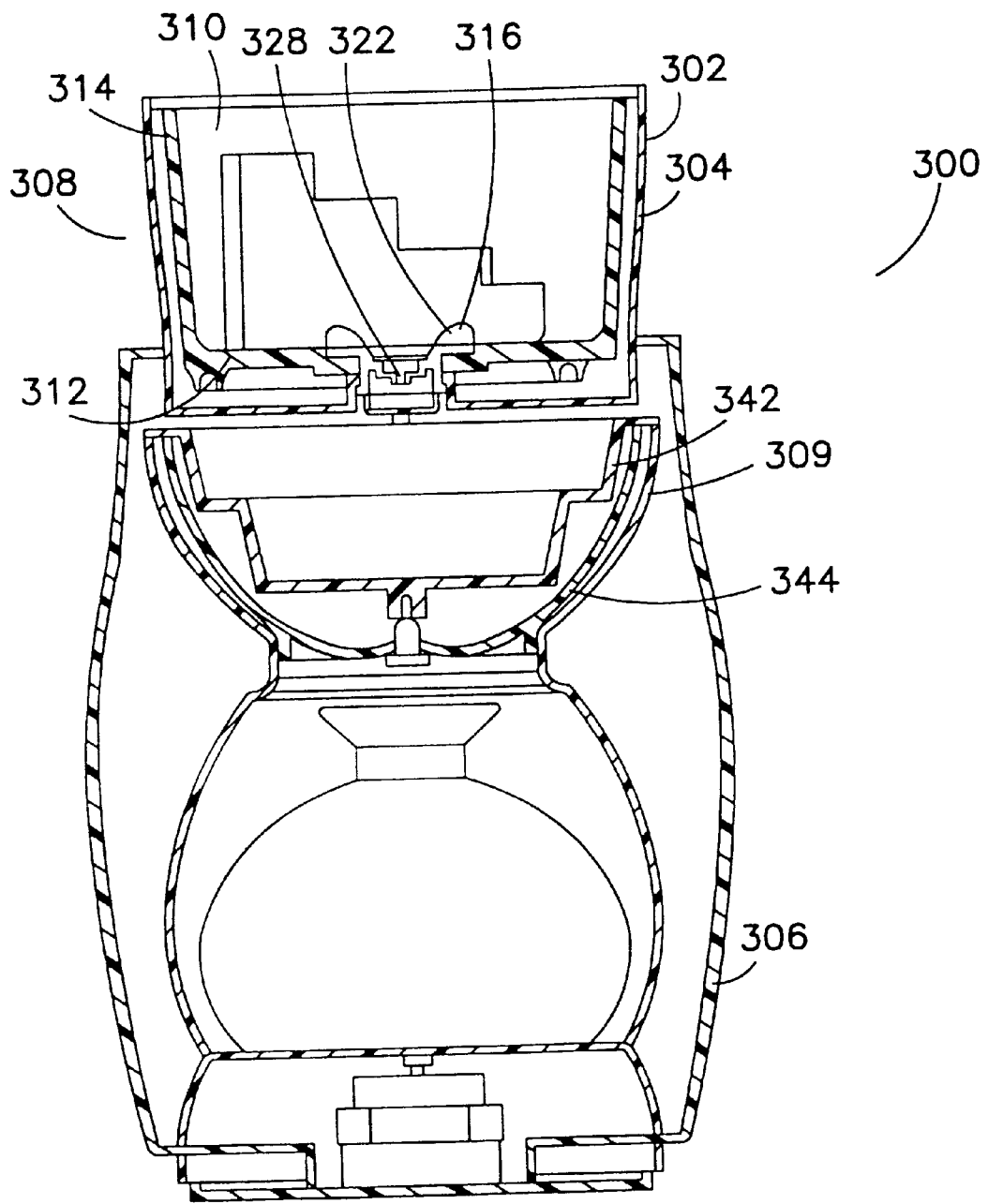
FIG. 18 is a front partial cross-sectional view of the alternative coffee maker.
Figure 19:
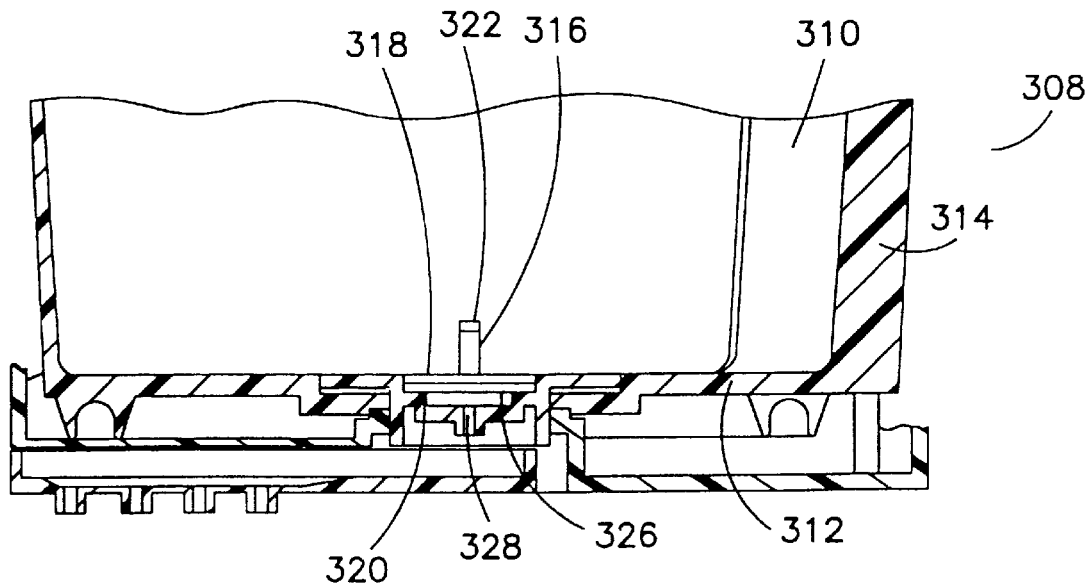
FIG. 19 is an enlarged right side fragmentary cross-sectional view of the heating chamber and distributor of the alternative coffee maker.
Figure 20:
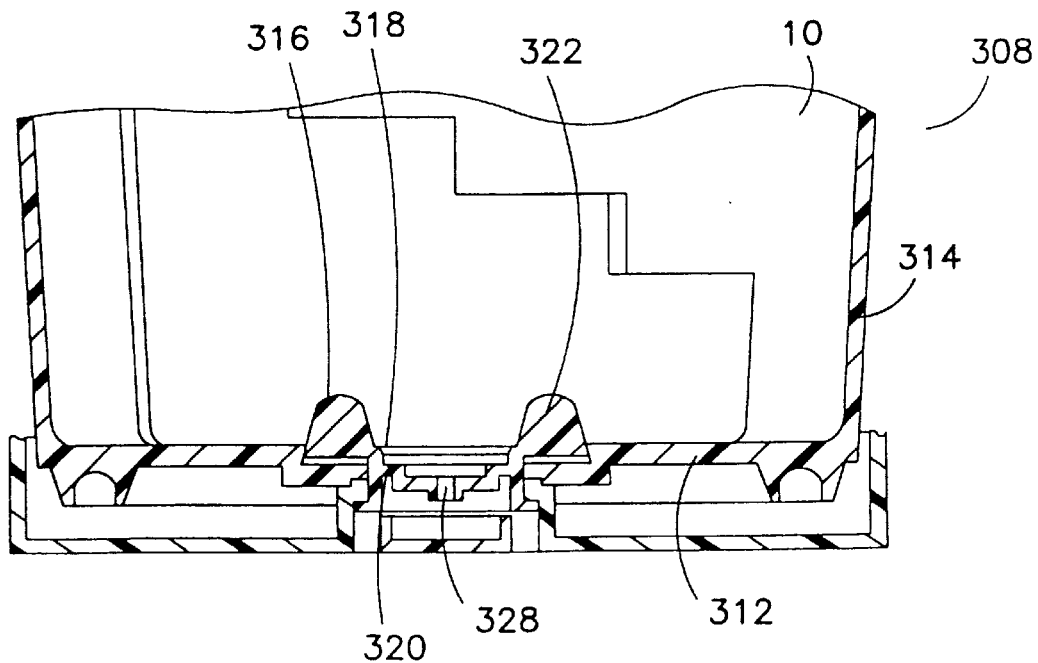
FIG. 20 is an enlarged fragmentary front cross-sectional view of the heating chamber and distributor of the alternative coffee maker.
Figure 21:
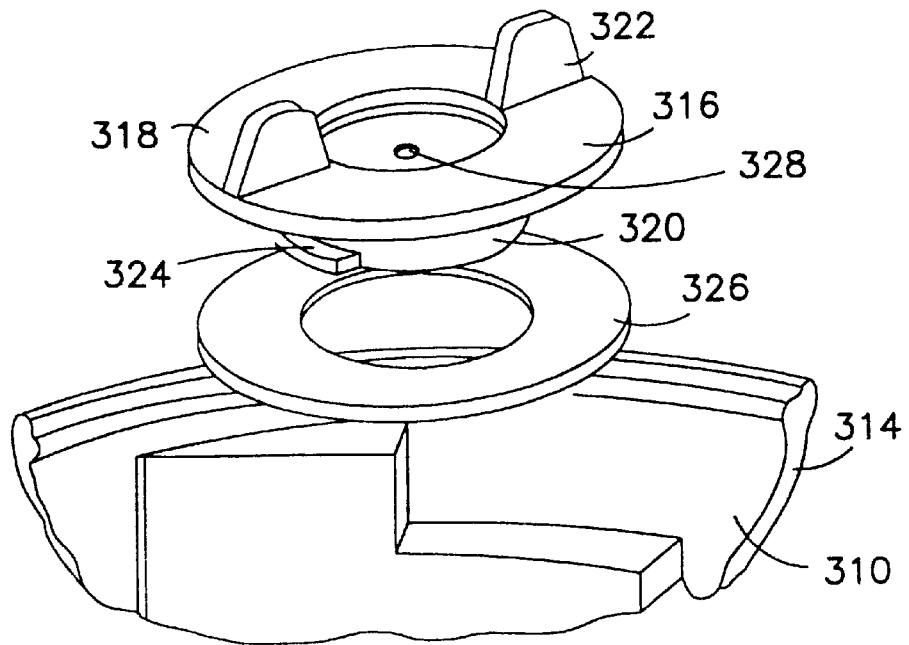
FIG. 21 is an enlarged exploded view of the modular distributor of the alternative coffee maker.
Figure 22:
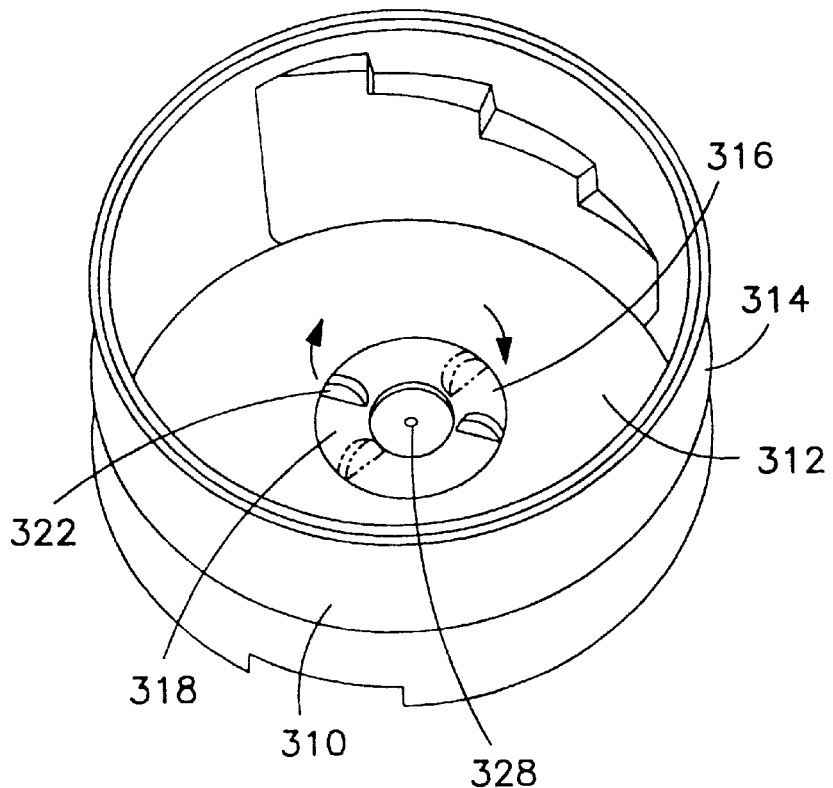
FIG. 22 is a fragmentary top perspective view of the heating chamber interior of the alternative coffee maker showing the modular distributor properly installed.

As seen in FIGS. 16–18, the batch heating system 308 is positioned at the top 304 of the counter top unit 302. Within the water heating system 308, there is a water heating chamber 310 having a bottom 312 and substantially vertical sides 314 extending upwardly therefrom and a distributor 316. A valve (not shown) controls the flow of water out of the water heating chamber 310 and is positioned on the bottom of the chamber 312, the valve being controlled by a solenoid or bimetal. The distributor 316 also is positioned on the bottom 312 of the water heating chamber 310. Distributor 316 controls the water flow rate out of the chamber 310. Preferably, the distributor 316 rests upon the valve.

As seen in FIGS. 19–23, the distributor 316 preferably mounts to the water heating chamber 310 using a bayonet mount. Distributor 316 has a top 318 and a bottom 320 and two wings 322 located on its top 318. The wings 322 allow a user to insert the distributor 316 and twist it, which locks the distributor 316 in place in water heating chamber 310. The bottom 320 of the distributor 316 has two protruding flanges 324 which, as the distributor 316 is set in place, fit under a washer 326 to secure the distributor 316 to the bottom 320 of the water heating chamber 310; as the distributor 316 is turned clockwise, the flanges 324 lock in place. Turning the distributor 316 counter-clockwise releases the flanges 324 and allows the distributor 316 to be removed. The distributor 316 also has a single central aperture 328 through which water may flow out of the water heating chamber 310. The distributor 316 is designed for easy removal, thus allowing for cleaning or replacement as lime accumulates on the distributor 316.

The distributor 316 is preferably constructed of a plastic, such as Ultem™ (a trademark of general Electric Corp.), treated to withstand the high temperatures present in the heating chamber 310. Other materials, including a coated metal, may also be used in constructing the distributor 316.

Figure 24:
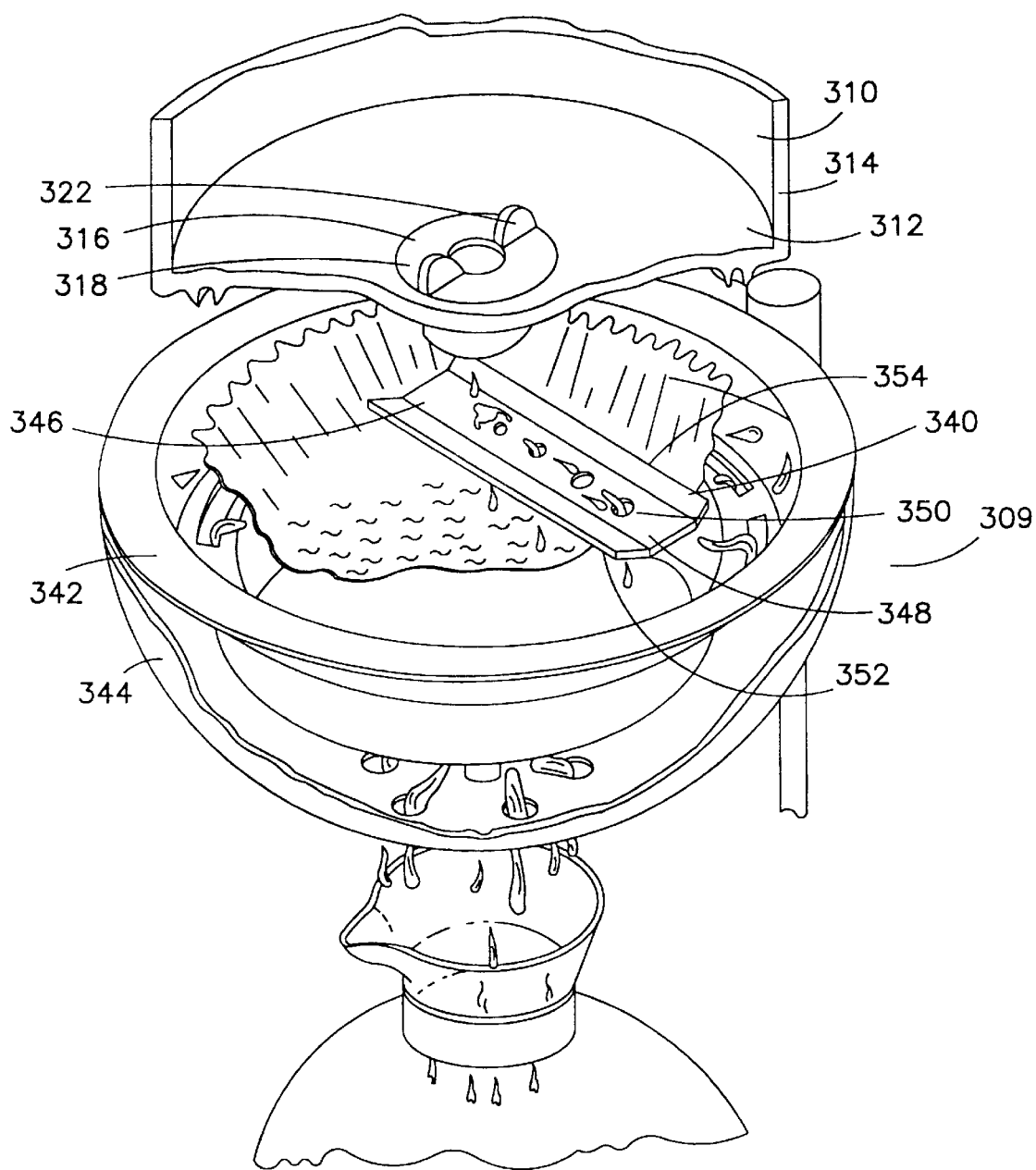
FIG. 24 is an enlarged fragmentary perspective view of the showerhead and centrifugal basket of the alternative coffee maker.

Referring now to FIG. 24, the basket assembly 309 includes a showerhead 340 and nested centrifugal and collection baskets 342 and 344. The showerhead 340 is trough-shaped and has upper and lower ends 346 and 348. The upper end 346 of the showerhead 340 is located directly under the distributor 316 and the valve to receive the heated water as it flows from the heating chamber 310. The showerhead 340 is angled with its upper end 346 positioned higher than its lower end 348, thus allowing the heated water to flow by gravity towards its lower end 348 which extends radially towards the side of the centrifugal basket 342. The showerhead 340 defines a plurality of apertures 350 along its length. The apertures 350 must be spaced from each other, although the amount of spacing may be varied. Additionally, the apertures 350 may be uniform or varied in size. As water flows out of the water heating chamber 310 and through the distributor 316, it lands on the upper end 346 of the showerhead 340. Water flows towards the lower end 348 of the showerhead 340 and through the apertures 350 into the centrifugal basket 342. Further, the showerhead 340 has a front side 352 and a rear side 354; the showerhead 340 is preferably inclined so that the front side 352 is higher than the rear side 354. Alternatively, the showerhead 340 may be held level.

The showerhead 340 is designed for easy removal to facilitate cleaning or replacement. The showerhead 340 is preferably constructed of plastic. However, other materials which are approved for contact with human consumables and can withstand brewing temperatures may also be used.

The counter top unit 302 further includes a control system 311 having a start button 360. The start button 360, which is manually operated, is located on the counter top unit 302. The control system 311 activates a heater (not shown) to heat the water in the chamber 310 to 195°–205° Fahrenheit then deactivates the heater. The control system 311 activates a drive motor 362 to spin the centrifugal basket 342, and then after a ten second delay, a solenoid or temperature sensitive bimetal disc opens the valve to allow water to flow out of the water heating chamber 310. The control system 311 monitors the volume of water in the chamber 310; once the chamber 310 is empty, the solenoid valve is closed by the control system 311 or the bimetal disc resets itself, and the centrifugal basket 342 is stopped after a fifteen second delay.

Referring to FIGS. 25–27, a second alternative embodiment of this invention includes an alternative distributor 370 for the batch water heating system 308. The alternative distributor 370 further controls the flow of water. It has two flow holes 372 and 374, a horizontal flow hole 372 and a vertical flow hole 374. Additionally, the distributor 370 has a needle valve (not shown) located within the flow holes 372 and 374. Securement of the alternative distributer 370 is accomplished using a bayonet type mount.

II. Assembly and Operation

An improved brewing process using a coffee maker made in accordance with this invention will now be described. The basket assembly 80 is manually swung away from the coffee maker unit 20 and a coffee filter positioned in the centrifugal basket 92. Up to 100 grams of coffee grounds are added to the basket 92. The basket assembly 80 is swung back into position within the housing 50, and the collection basket 94 contacts the spring-loaded plunger 132, pushing the plunger 132 and rotating the drive motor 120 about the pins. The shaft 126 swings downwardly, and the O-ring 128 rests on the rim 104 of the centrifugal basket 92.

Water is manually poured into the funnel region 60 of the heating system 52 and flows into the storage tank 62 and flow pipe 64, a portion of the water flowing past the heating portion 76 of the flow pipe 64. The start button 200 is pushed by the user to initiate the brewing process, and the water heating element 66 is activated for an initial seven seconds. This is sufficient time to heat the water in the heating portion 76 of the flow pipe 64 preferably to between 195–205° Fahrenheit. The heating element 66 is then deactivated for eight seconds. During this time, heat transfer occurs between the heated portion of water within the heating portion 76 of the flow pipe 64 and the unheated portion in the downstream portion of the pipe 64. As the heating element 66 is deactivated, the microprocessor 202 directs power to the drive motor 120 to begin spinning the basket 92 and to the heating element 161 if the glass carafe 150 is within the carafe cavity 154.

The heating element 66 is re-activated for the remainder of the brewing cycle. Water in the heating portion 76 of the flow pipe 64 is heated by the heating element 66 until it exceeds 212° Fahrenheit and vaporizes to expand within the flow pipe 64. Due to the presence of the check valve between the flow pipe 64 and the water storage tank 62, the water vapor expands into the downstream portion of the flow pipe 64. The first batch of water vapor, which corresponds to the water present in the heating portion 76 of the flow pipe 64, pushes the nonvaporized, yet heated, water before it through the pipe 64. As the water vapor loses contact with the heating element 66, ideally it cools to 195–205° Fahrenheit and condenses. The brew water continues to flow through the pipe 64, vaporizing then condensing after it passes through the heating portion 76. The condensed water flows from the outflow portion 74 of the flow pipe 64 into the showerhead 78. By gravity, the water flows toward the lower end 86 of the showerhead 78 and passes through the plurality of apertures 90. As schematically shown in FIG. 28, the coffee slurry forms a generally concave profile with respect to the outer sloped basket walls 98. Accordingly, the radial thickness of the coffee slurry at a given height from the basket bottom 96 decreases from the bottom to the top. Therefore, more water is allowed to fall to the center of the basket 96 as compared to the side where the radial thickness of the slurry is less.

The heated brew water falls upon coffee grounds held in the spinning centrifugal basket 92. The basket 92 is preferably spinning at 130 rpm, which prevents overflow of the grounds and water slurry. As the basket 92 spins, distinct annular areas of wet grounds are formed. The water travels radially outward due to the spinning of the centrifugal basket 92, wetting all of the grounds. Thus, the water is generally uniformly distributed through the coffee grounds with each of the grounds receiving approximately the same exposure to the water during the brewing process. The coffee escapes the centrifugal basket 92 through the vertical ports 106 which extend to the bottom edge 102 of the sides 98 of the basket 92. Extending the ports 106 to the bottom edge 102 allows the coffee to escape the basket 92 without requiring that the coffee reach some opening at a predetermined height above the bottom of the basket 92, as required by other coffee makers, while providing an ideal extraction of coffee from the grounds. Thus, the basket 92 may rotate at a slower speed, minimizing the amount of slurry and coffee grounds which overflow the basket 92.

As the coffee passes though the vertical ports 106, it falls into the collection basket 94 and flows down its side walls 112. The coffee passes out of the basket through the bottom ports.

The carafe, either glass or thermal 150 or 152, sets on the heating surface 160 within the carafe cavity 154 directly below the ports and receives the brewed coffee. If the glass carafe 150 is within the cavity 154, the plunger 168 is displaced so that the ramp 174 is in contact with the switch 176. After the required delay, the microprocessor 202 directs power to the heating element 161. However, if the thermal carafe 152 is within the carafe cavity 154, the plunger 168 is displaced a greater distance, and the ramp 174 does not maintain contact with the switch 176 for the required activation time period.

The water heating system 206 monitors the amount of water remaining in the flow pipe 64. As the thermistor 214 detects a rise in the temperature of the heating element 66, the microprocessor 202 deactivates the element 66 to end the brew cycle. The centrifugal basket 92 is spun at a higher speed for twenty seconds to extract the remainder of the coffee. The remaining portion passes through the vertical ports 106, into the collection basket 94, and thence into the carafe 150 or 152. If the glass carafe 150 is within the carafe cavity 154, the heating element 161 remains activated for two hours after the brew cycle ends unless the coffee maker 10 is switched off or the carafe 150 is removed from the cavity 154.

The improved brewing process using the alternative coffee maker 300 will now be described. Water is manually poured into the heating chamber 310, and the start button 360 is pushed by the user to initiate heating. Water is heated to, and maintained at preferably 195–205° Fahrenheit. Feedback controls 311 indicate when the preferred temperature range is reached, and then drive motor 362 begins spinning centrifugal basket 342 holding coffee grounds. A solenoid/bimetal then opens a valve in the bottom 312 of the heating chamber 310 to allow the heated water to flow out of the heating chamber 310.

The modular distributor 316 regulates the flow of the heated water out of the heating chamber 310. After water passes through the distributor 316, it lands on the showerhead 340. The trough-shaped showerhead 340 catches the heated water and channels it through the plurality of apertures 350. The brew water falls upon coffee grounds held in the centrifugal basket 342. The centrifugal basket 342 spins as the water falls on the coffee grounds, creating distinct annular areas of wet grounds. The water then travels radially outward due to the spinning of the centrifugal basket 342, wetting all of the grounds. Thus, the water is generally uniformly distributed through the coffee with each of the grounds receiving approximately the same exposure to the water during the brewing process.

The water passes through the coffee grounds, exits the centrifugal basket 342 and flows into the collection basket 344. The coffee is then funneled from the collection basket 344 into a carafe.

If the alternative modular distributor 370 is used, the flow of water onto the showerhead 340 is further regulated. This alternative distributor 370 allows four cups of coffee to be brewed in four minutes or four to ten cups of coffee to be brewed in four to six minutes. The alternative distributor 370 includes two orifices 372 and 374 through which water may flow. If only four cups of water are placed in the heating chamber 310, the water flows through only one orifice, the horizontal flow hole 372. If more than four cups of water are used, the water also flows through the vertical flow hole 374; utilizing the two flow holes 372 and 374 decreases the overall time for brewing several cups of coffee. A needle valve, located in the flow holes 372 and 374, breaks up the surface tension of the water to create a flow of smaller droplets. This alternative distributor 370 includes a bayonet mount for easy removal. Hence, the distributor 370 may be easily cleaned or replaced if lime buildup is a problem.

The above descriptions are those of preferred embodiments of the invention. Various alterations and changes can be made without departing from the spirit and broader aspects of the invention as defined in the appended claims, which are to be interpreted in accordance with the principles of patent law including the Doctrine of Equivalents.

The embodiment of the claims in which an exclusive property or privilege is claimed are defined as follows:

1. A coffee maker, comprising:
    a grounds basket including a rotating means for rotating said basket at less than about 150 revolutions per minute and containing coffee grounds and receiving water, said basket having a bottom and sides extending upwardly therefrom, a plurality of side ports defined by said sides, said ports originating at and extending generally upwardly from said bottom in said sides of said basket, wherein coffee exits said baskets substantially only through said side ports.

2. The coffee maker as recited in claim 1 wherein the rotation of said basket forces the coffee through said ports at a rate sufficient to prevent excess coffee from accumulating within said basket and overflowing said sides of said basket.

3. The coffee maker as recited in claim 1 wherein said basket rotates at about 100–150 revolutions per minute.

4. The coffee maker as recited in claim 1 wherein said basket rotates at about 130–150 revolutions per minute.

5. The coffee maker as recited in claim 3 wherein said basket rotates at about 100–130 revolutions per minute.

6. A coffeemaker comprising:
    a centrifugal rotating grounds basket, including sides and a circular bottom, said circular bottom including an outer perimeter, said sides extending from said perimeter said sides including a lower portion adjacent said bottom, said sides defining a plurality of ports extending substantially vertically from said perimeter and within said lower portion, means for rotating said basket at less than about 150 RPM, whereby coffee exits the basket through said ports.

7. The coffee maker of claim 6 wherein said ports are circumferentially spaced.

8. The coffee maker as recited in claim 6 wherein said basket rotates at about 100–150 revolutions per minute.

9. The coffee maker as recited in claim 8 wherein said basket rotates at about 100–130 revolutions per minute.

10. The coffee maker as recited in claim 6 wherein said basket rotates at about 130 revolutions per minute.

11. A coffee maker comprising:

a rotating grounds basket including a bottom, angled sides extending upwardly from said bottom, said sides including an upper edge and a lower edge, said upper edge having a basket rim extending therefrom, said lower edge forming a periphery of said bottom, said sides including a lower portion adjacent said lower edge, said sides defining a plurality of slots extending upwardly from said periphery of said bottom in said lower portion; and a drive motor positioned adjacent said rotating grounds basket, said drive motor including means for contacting said rotating grounds basket and rotating said basket at less than about 150 revolutions per minute.

12. The coffee maker as recited in claim 11 wherein said basket rotates at about 100–150 revolutions per minute.

13. The coffee maker as recited in claim 12 wherein said basket rotates at about 130–150 revolutions per minute.

14. The coffee maker as recited in claim 12 wherein said basket rotates at about 100–150 revolutions per minute.

15. The coffee maker as recited in claim 11 wherein said basket rotates at about 130 revolutions per minute.

16. The coffee maker of claim 11 wherein said means for contacting said rotating basket contacts said upper edge.

17. The coffee maker of claim 16 comprising a collection basket including a bottom and upwardly extending sides, said collection basket including a means for supporting said rotating grounds basket.

18. The coffee maker of claim 17 wherein said means for supporting said collection basket is a spindle, said bottom of said rotating grounds basket interfitting with said spindle.

* * * * *